(12) United States Patent
Petersen

(10) Patent No.: US 7,172,688 B2
(45) Date of Patent: Feb. 6, 2007

(54) MIXED IMMISCIBLE LIQUIDS VACUUM, SEPARATION, AND DISPOSAL METHOD AND SYSTEM (MOD 1)

(76) Inventor: Robert N. Petersen, 2300 39th St., Bellingham, WA (US) 98229-3380

(*) Notice: Subject to any disclaimer, the term of this patent is extended or adjusted under 35 U.S.C. 154(b) by 324 days.

(21) Appl. No.: 10/729,765

(22) Filed: Dec. 8, 2003

(65) Prior Publication Data
US 2005/0121375 A1 Jun. 9, 2005

(51) Int. Cl.
*B01D 17/025* (2006.01)

(52) U.S. Cl. ............ 210/104; 210/115; 210/134; 210/207; 210/259; 210/299; 210/521; 210/532.1; 210/538; 210/539; 210/540

(58) Field of Classification Search ............ 210/86–90, 210/103, 104, 109–117, 120–123, 127, 134–137, 210/143, 170, 207, 218, 258, 259, 295, 299, 210/519–521, 533–540; 137/215–217
See application file for complete search history.

(56) References Cited

U.S. PATENT DOCUMENTS

| | | | |
|---|---|---|---|
| 4,492,630 A | | 1/1985 | Rymal |
| 4,521,312 A | * | 6/1985 | Anderson ............ 210/744 |
| 4,623,452 A | | 11/1986 | Petersen |
| 4,960,513 A | | 10/1990 | Young |
| 5,133,882 A | | 7/1992 | Stearns |
| 5,202,031 A | | 4/1993 | Rymal |
| 5,464,529 A | | 11/1995 | Kozak |
| 5,484,522 A | | 1/1996 | Entrekin |
| 5,587,065 A | * | 12/1996 | Burns ............ 210/104 |
| 5,679,258 A | | 10/1997 | Petersen |
| 6,444,119 B1 | * | 9/2002 | Mains, Jr. ............ 210/85 |

* cited by examiner

*Primary Examiner*—Joseph Drodge

(57) ABSTRACT

A system to collect by vacuum conveyance, separate, and discharge two mixed immiscible liquids with different specific gravities comprising a prefilter vessel 200, a vacuum tank 100, an optional heavy phase intermediate separation stage 40, and an optional light phase intermediate separation stage 30. Vacuum tank 100 is under a constant regulated vacuum, which sucks mixed immiscible liquids with different specific gravities from their respective remote source(s) through conduit(s) connected to vacuum tank 100. Collection conduits can have manually, mechanically, or electromechanically controlled valves at their source ends. Any grit, sediment, particles, and/or floatable debris in the collection conduits is first removed, and then any entrained air in the mixed liquid stream is removed, from the mixed liquid stream prior to undergoing any phase separation stages. Initial phase separation occurs automatically in vacuum tank 100 without any phase interface detection devices. Vacuum tank 100 provides quiescent conditions for gravity separation of mixed immiscible liquids. Gravity separation is further enhanced by low grade dissolved air flotation separation which is induced by the vacuum in vacuum tank 100. Additional phase separation can occur, if necessary, in intermediate separation stage(s) 40 and/or 30. Heavy phase intermediate separation stage 40 separates the light phase from the heavy phase, if necessary. Light phase intermediate separation stage 30 separates the heavy phase from the light phase, if necessary. Separated phases are discharged to their own individual repository or depository, such as a storage tank, a sewer, well injection, additional separation, additional treatment to remove other contaminants, and/or process reuse.

19 Claims, 6 Drawing Sheets

FLOWCHART

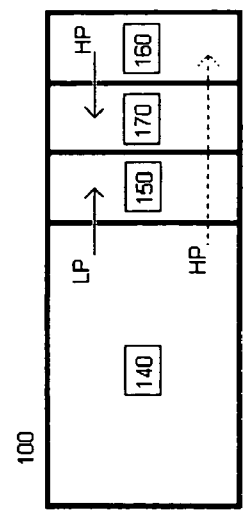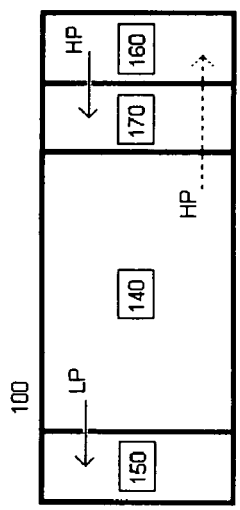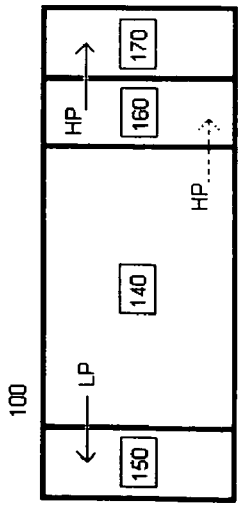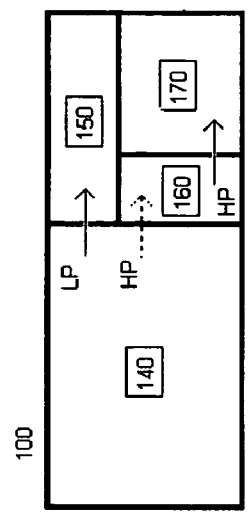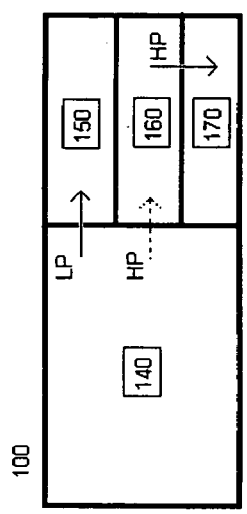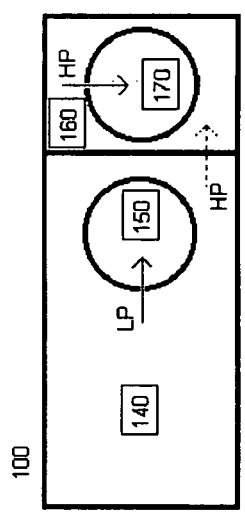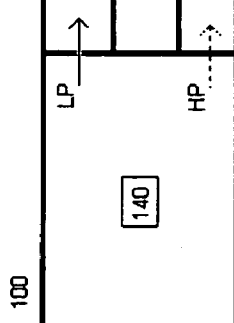

MIXED IMMISCIBLE LIQUIDS VACUUM, SEPARATION, AND DISPOSAL METHOD AND SYSTEM (MOD 1)

CROSS-REFERENCES TO RELATED APPLICATIONS

BACKGROUND

1. Field of Invention

This invention relates to the arts of liquid/liquid separators and vacuum transport systems, specifically to numerous significant improvements to a previously patented Mixed Immiscible Liquids Vacuum, Separation, and Disposal Method and System (U.S. Pat. No. 5,679,258 to Petersen dated 1997 Oct. 21).

2. Definitions
   (a) The term "mixed" means two existing together.
   (b) The term "immiscible" means naturally resisting, or being incapable of, blending or combining homogeneously and permanently. Immiscible liquids normally cannot be blended together whatsoever, or can be blended only slightly.
   (c) The term "treated" means has already undergone some physical or chemical process or processes that has altered its original characteristics.
   (d) The term "untreated" means has not yet undergone any physical or chemical process or processes intended to alter its original characteristics.
   (e) The term "intermediate" means between two.
   (f) The term "terminal" means the final, last, or end.
   (g) The term "source" means the origination of, or the initial physical location of, untreated mixed immiscible liquids, and might comprise sumps, pits, tanks, bilges, drains, sewers, or spills into water or on land.
   (h) The term "facility" means a physical point, site, location, treatment plant or system, sewer, drainage pipe, drainage field, or any container, tank, or similar storage receptacle.
   (i) The term "phase" means an identifiable, partially or completely separable, component liquid in mixed immiscible liquids.
   (j) The term "heavy phase" means the phase in mixed immiscible liquids with the higher specific gravity.
   (k) The term "light phase" means the phase in mixed immiscible liquids with the lower specific gravity.
   (l) The term "predominant phase" means the phase in mixed immiscible liquids that is greater than or equal to 50% by volume of the total volume of mixed immiscible liquids.
   (m) The term "subdominant phase" means the phase in mixed immiscible liquids that is less than 50% by volume of the total volume of mixed immiscible liquids.
   (n) The term "conduit" means a pipe, tube, hose, or other similar device to transport liquids or gases.
   (o) The term "vacuum tank" means a sealed vessel, chamber, reservoir, or container capable of sustaining within itself a vacuum (negative atmospheric pressure) without structural collapse or leakage.
   (p) The term "water" can mean distilled water, fresh water, lake water, stream water, river water, creek water, ground water, waste water, and/or sea water.
   (q) The term "proximate" means physically adjacent to.

3. Discussion of Prior Art

U.S. Pat. No. 5,679,258 to Petersen dated 1997 Oct. 21 describes a system that:

1. Conveys, using negative atmospheric pressure (i.e., "vacuum collects"), two mixed immiscible liquids ("liquids") of different specific gravities from their source location(s) into a vacuum tank, and
2. Removes, under vacuum, any grit, sediment, particulates, and floating debris that might be present in the liquid inflow stream, and
3. Removes, under vacuum, any entrained air that might be present in the liquid inflow stream, and
4. Dissociates, under vacuum, the two liquids into their respective gross fractions inside the vacuum tank using:
   4.1. Vacuum-induced low grade dissolved air flotation, and
   4.2. Differential specific gravity/quiescent separation, and
   4.3. If the two liquids are water and oil, optional oleophilic media contact entrapment, and
5. Extracts the two separated phases from the vacuum tank and discharges them into:
   5.1. Supplemental phase separation stage(s), and/or
   5.2. Their respective phase terminal facilities.

The above described system suffers from a number of problems and disadvantages, more specifically described as follows (NOTE: The numbers in parentheses in the text refer to the "List of Reference Numerals" reflected in U.S. Pat. No. 5,679,258):

1 Emulsified oil (occasionally resembling pudding in consistency) that entered into the vacuum tank (51) could adhere to the phase interface sensor (44)—a float switch using a specially weighted float—which could immobilize it, thereby disabling its proper light phase (e.g., oil) extraction and discharge pump (39) and heavy phase (e.g., water) extraction and discharge pump (38) operation selection function. As a consequence of this malfunction, oil could escape through the water extraction and discharge pump, or water could escape through the oil extraction and discharge pump. Also as noted in U.S. Pat. No. 5,679,258 "Background—Discussion of Prior Art" paragraph 10, electronic interface probes do not offer a preferential solution to this problem either. Thus, neither embodiment of the basic system affords reliable and consistent light phase/heavy phase (e.g., oil/water) interface detection.

2 The heavy phase (e.g., water) could inadvertently enter the light phase (e.g. oil) extraction and discharge pump inlet pipe elbow (26A) if, for example, the phase interface sensor failed (see paragraph (2) above), or if the oil extraction and discharge pump inlet piping check valve (52C) failed. Under these conditions, the oil extraction and discharge pump, at best, would eventually discharge the heavy phase (e.g., water) into the light phase receptacle(s) (41), thereby defeating the desire to minimize the quantity of water present with the separated and stored oil. In addition to the previous statement, and at worst, the oil extraction and discharge pump, despite being of a low sheer/low agitation type, would partially emulsify the oil, further complicating ultimate oil disposition.

3 Whenever the liquid surface level in the vacuum tank is at or just below the upper liquid surface level sensor (43C), then the liquid surface level in the narrow space between the floating light phase vertical barrier plate (37) and the grit, sediment, particulate, and floating debris removal/collection chamber wall (61) will rest nearly at the same level (depending of course on the amount of water and/or oil that is trapped in this narrow space). If the liquid is predominantly, or entirely, oil, then any water that enters the vacuum tank will flow over the horizontal overflow weir (62) and cascade down through this relatively thick layer of oil. This water flow will drag some of the oil with it under the bottom of the floating light phase vertical barrier plate, while agitating the remaining oil (even if slightly), which will emulsify it (even if slightly). Minimizing the degree of oil emulsification is generally desirable in all styles and types of oil/water separators.

4 The inflow stream grit, sediment, particulate, and floating debris chamber barrier screen (45), which provided about 75 in$^2$ of net effective surface area, would, unless the liquid inflow streams was unusually "clean", plug after only a few hours of system operation, thereby rendering further liquid collection and inflow impossible. To remedy this serious problem and restore full operational capabilities, the operator performed one (or both) of the following time-consuming actions:

A. Deenergized system electric power; purged vacuum tank vacuum; disconnected and temporarily removed selected system components that permitted subsequent access to vacuum tank interior; removed vacuum tank top; cleaned inflow stream grit, sediment, particulate, and floating debris chamber barrier screen; reinstalled vacuum tank top; reconnected system components previously removed; reenergized system electric power.

B. Deenergized system electric power; purged vacuum from tank vacuum; introduced water into vacuum tank through vacuum tank bottom drain valve (53B) until vacuum tank was almost completely full; opened grit, sediment, particulate, and floating debris removal/collection chamber drain valve (53C), which backflushed inflow grit, sediment, particulate, and floating debris chamber barrier screen, hopefully removing all or most of the accumulated material. If this tactic failed, then the operator resorted to restorative action A above.

SUMMARY OF THE INVENTION—OBJECTIVES AND ADVANTAGES

Accordingly, and together with U.S. Pat. No. 5,679,258 "Summary of the Invention—Objects and Advantages" numbers (5)–(9), (11), (13), and (14), which are repeated with revised identification numbers and some text revisions below, other objectives and advantages of this invention are:

(1) To preserve, and to enhance, gross light phase and heavy phase separation inside the vacuum tank, and once separated, to enable automatic light phase and heavy phase removal from the vacuum tank without needing or using any type (e.g., mechanical, electrical, electro-mechanical, electronic) of interface detector, sensor, device, or other means, by employing instead specially configured and designed baffling inside the vacuum tank that create a light phase only sump and a heavy phase only sump, each sump connecting to, respectively, the light phase (oil) extraction and discharge pump and the heavy phase (water) extraction and discharge pump, further with each sump being equipped with its own liquid surface level sensors, and with each sump incorporating its own inflow control horizontal weir, each weir existing at different elevations, the light phase sump inflow control horizontal weir being higher than the heavy phase sump inflow control horizontal weir. More succinctly, the invention described herein performs, as a minimum, exactly the same functions described in the Background—Discussion of Prior Art paragraph above without an interface sensor.

(2) To prevent inadvertent entry of the heavy phase (e.g., water) into the light phase (e.g. oil) extraction and discharge pump inlet by employing instead specially configured and designed baffling and respective light phase only and heavy phase only sumps inside the vacuum tank, which in turn, and respectively, connect to light phase (oil) and heavy phase (water) extraction and discharge pumps, in conjunction with instream flow rate control/limiting features/devices/means.

(3) To further reduce the degree of oil emulsification that might result when water descends through any floating oil layers inside the vacuum tank by reducing the height of the oil that the water must penetrate.

(4) To economically and efficiently intercept, trap, and/or remove with minimum liquid agitation or turbulence any grit, sediment, particulates, and/or floating debris that are entrained in the mixed immiscible liquids by inserting a standard prefilter/strainer element/cartridge that provides about 1530 in$^2$ of net effective surface area in the inflow stream piping before the vacuum tank, thereby:

(a) Enhancing the degree/amount of grit, sediment, particulate, and/or floating debris removal, and (b) Dramatically extending the intervals between interception device cleaning and/or replacement due to the dramatically increased (by about 20×) net effective surface area, and (c) Providing a convenient and quick method of replacement/cleaning, thus restoring the system to operation much faster than before, and (d) Preventing any grit, sediment, particulates, and/or floating debris from interfering with the proper operation of the respective light phase and heavy phase sump free surface lower and upper liquid surface level sensors, and (e) Preventing any grit, sediment, and/or particulates from entering the respective light phase and heavy phase pump suction pipes.

(5) To preserve prevention of disturbance or agitation of the floating light phase inside the vacuum tank during mixed immiscible liquids collection (while preserving the air elimination and anti-back-siphonage features inherent in the prior art system) by introducing all mixed immiscible liquids collected onto a horizontal plate that is positioned slightly above the maximum probable upper liquid surface level in the vacuum tank, and features a raised barrier plate at one end, which forces the liquids to the barrier free opposite end, where the liquids flow down through a narrow space that is formed by a vertical baffle and the end of the vacuum tank, with the vertical baffle extending below the probable light phase/heavy phase interface detection elevation, which deposits the liquids in a laminar flow, and with minimal agitation and no entrained air bubbles, well under any light phase floating in the vacuum tank.

(6) To preserve adequate time of detention of the two phases in the vacuum tank to permit gross fractions of the light phase to float to the surface.

(7) To preserve the option to install inside the vacuum tank oleophilic media offering a relatively high surface area when compared to its in-place volume, which further increases opportunities for entrapment or coalescence of the light phase when the light phase is oil in water inside the vacuum tank. This media should also be non-interconnecting and offer a low packing factor (that is, low pressure drop per unit of flow distance in the direction of flow).

(8) To preserve the simpler, more reliable, and less costly method to prevent liquid entry into the vacuum pump by using the already existing extraction and discharge pump automatic activation liquid surface level sensors to simultaneously de-energize the vacuum pump and the vacuum pump control circuits as long as it/they sense(s) a liquid presence. Furthermore, to add a liquid surface level activated relief valve to quickly purge the vacuum in the vacuum tank before any residual vacuum in the vacuum tank can draw liquid into the vacuum tank above the heavy phase sump inflow control horizontal weir, which could cause heavy phase to enter the light phase sump.

(9) To preserve the use and position of the vacuum relief valve so that it may perform the dual functions of providing a source of cooling air to the vacuum pump in case a malfunction causes it to run without its normal source of air from the vacuum tank, and ensuring the net positive suction head required by the light phase (oil) extraction and discharge pump and heavy phase (water) extraction and discharge pump does not exceed the net positive suction head available.

(10) To preserve activation of remote and/or local visual and/or audible alarms and automatically stop, or to prevent, operation of the vacuum pump, heavy phase extraction and discharge pump, or light phase extraction and discharge pump if the light phase storage receptacle(s) fill(s) to capacity by adding a liquid surface level sensor in the light phase storage receptacle(s) which will de-energize the vacuum pump, heavy phase pump, and light phase pump and their respective control circuits as long as the liquid surface level sensor senses a liquid presence.

(11) To preserve the incorporation of a check valve in the heavy phase discharge piping downstream of the heavy phase intermediate treatment stage.

(12) To preserve conveyance of exhaust air from the vacuum pump into the vent conduit of the light phase storage receptacle(s). This duct also serves as a conduit for any liquid which accidentally enters the vacuum pump, the liquid then filling the light phase storage receptacle(s). In conjunction with the liquid surface level sensing device mentioned in subparagraph (10) above, this combination will provide almost fail safe prevention against accidental light phase discharge into the environment caused by overfilling the light phase storage receptacle(s), either by the light phase pump, or by the vacuum pump.

(13) To preserve the accommodation of secondary separation of the light phase component once discharged from the vacuum tank in a similar manner as the heavy phase.

(14) To preserve the incorporation of a pressure differential sensor, or a flow sensor, that activates an alarm device that recommends coalescer element replacement if the element becomes plugged or fouled to the point that overall system through-put becomes unacceptable to the system owner or operator.

(15) To incorporate a liquid surface level sensor inside the prefilter vessel that activates an alarm device that activates an alarm device that recommends prefilter element replacement if the element becomes plugged or fouled to the point that overall system through-put becomes unacceptable to the system owner or operator.

(16) To preserve the accommodation, without adverse affect, the continuous or intermittent collection of mixed immiscible liquids of differing specific gravities in any mix, with or without grit, sediment, particulates, and/or floating debris, with or without entrained air, whether mechanically, electro-mechanically, or manually initiated and/or controlled, plus their separation into their respective phases, and plus their automatic discharge into their respective terminal facilities, either directly from the vacuum tank, or through an intermediate separation stage.

Further objects and advantages of this invention will become apparent from a consideration of the drawings and ensuing descriptions.

DESCRIPTION OF THE DRAWINGS

FIG. 4 shows the vessel in its normal position and in its tilted position for element replacement. This figure is not to scale.

FIG. 5 shows the vessel only in its normal position. This figure is not to scale.

FIG. 8, FIG. 9, FIG. 10, FIG. 11, FIG. 12, FIG. 13, FIG. 14, and FIG. 15 are all plan view schematics of the vacuum tank that show alternative configurations of the main gross phase separation chamber, the light phase sump, the heavy phase sump, and the heavy phase equalization chamber. This figure is not to scale.

LIST OF REFERENCE NUMERALS

Figure 1:
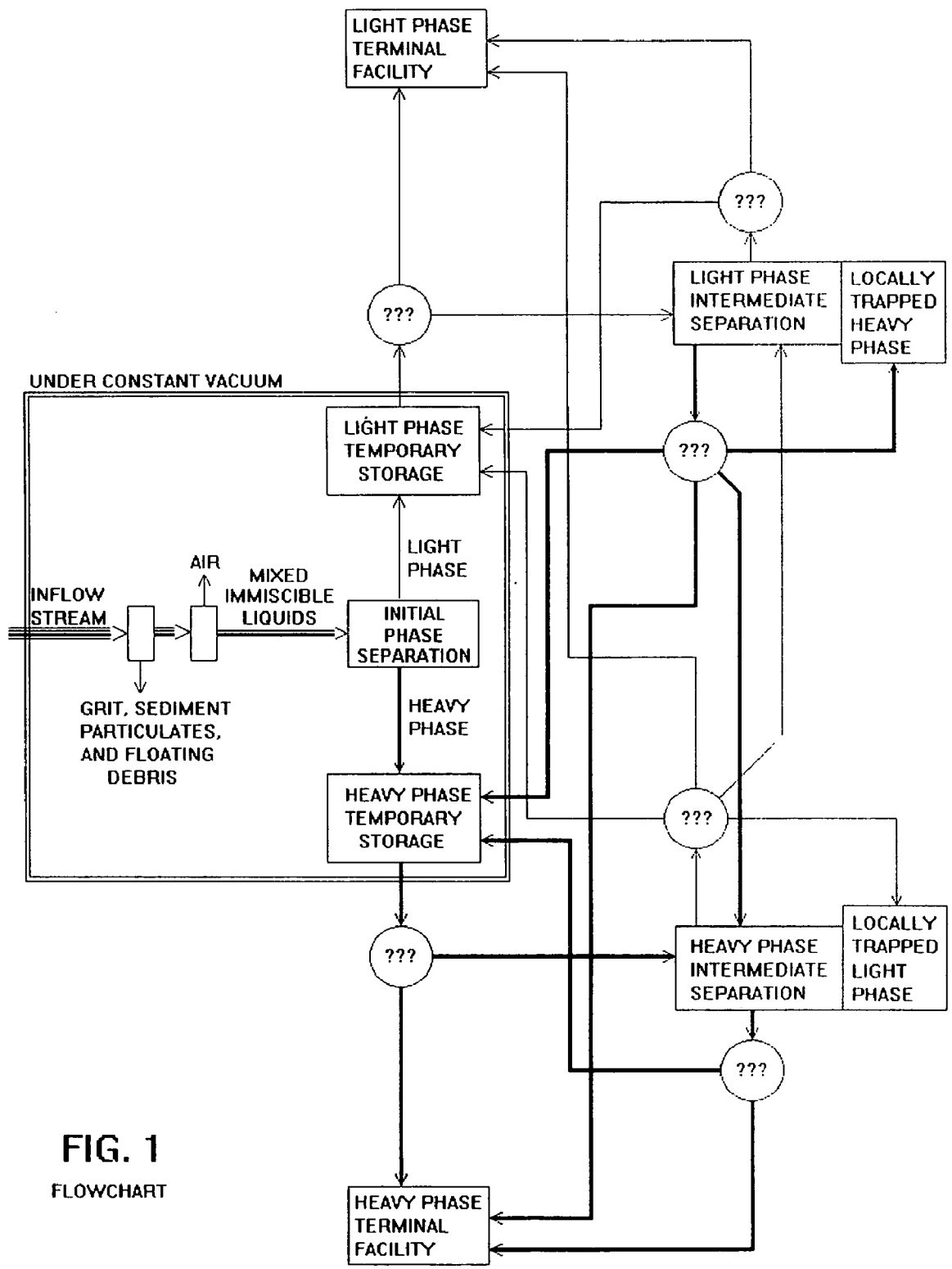
FIG. 1 outlines the basic process steps performed by the invention in flow chart form. This figure is not to scale.

10 Mixed Immiscible Liquids Vacuum, Separation, and Disposal Method and System (Mod 1)
20 Grit, particulates, and floating debris removal stage
30 Light phase intermediate separation stage
31 Light phase discharge conduit
32 Partially treated light phase conduit
33 Light phase intermediate separation stage heavy phase return conduit
40 Heavy phase intermediate separation stage 41 Heavy phase discharge conduit
42 Partially treated heavy phase conduit
43 Heavy phase intermediate separation stage light phase return conduit
50 Electrical/logic panel
100 Vacuum tank
110 Energy dissipation and flow distribution chamber
111 Energy dissipation and flow distribution chamber left end plate
112 Energy dissipation and flow distribution chamber right end plate
113 Energy dissipation and flow distribution chamber perforated bottom plate
114 Separated light phase protection roof
115 Separated light phase protection roof right end plate
116 Prefilter vessel outlet vacuum tank penetration
117 Coalescer vessel drain vacuum tank penetration
118 Coalescer vessel trickle return line vacuum tank penetration
120 Air void
130 Separated light phase anti-disturbance chamber
131 Separated light phase anti-disturbance baffle
132 Dynamic inflow level
140 Main gross phase separation chamber
141 Perforated oleophilic media containment plate
142 Oleophilic media containment bar
143 Oleophilic media
144 Light phase/heavy phase interface
145 Drain valve
145A Drain conduit
150 Light phase sump
151 Light phase sump left plate
152 Light phase sump bottom plate
153 Light phase sump right plate
154 Light phase sump weir static level
155 Light phase sump weir dynamic level
156 Light phase sump lower liquid surface control level
156A Light phase sump lower liquid surface level sensor
157 Light phase sump upper liquid surface control level
157A Light phase sump upper liquid surface level sensor
158 Light phase sump liquid level sensor guide rod
159 Drain valve
159A Drain conduit
160 Heavy phase equalization chamber
170 Heavy phase sump
171 Heavy phase sump left plate
172 Heavy phase sump weir static level
173 Heavy phase sump weir dynamic level
174 Heavy phase sump lower liquid surface control level
174A Heavy phase sump lower liquid surface level sensor
175 Heavy phase sump middle liquid surface control level
175A Heavy phase sump middle liquid surface level sensor
176 Heavy phase sump upper liquid surface control level
176A Heavy phase sump upper liquid surface level sensor
177 Heavy phase sump liquid level sensor guide rod
178 Drain valve
178A Drain conduit
200 Prefilter vessel
201 Removable prefilter vessel cover
202 Prefilter element
210 Prefilter vessel liquid surface control level
210A Prefilter vessel liquid surface level sensor
230 Mixed immiscible liquids collection conduit
231 Prefilter vessel discharge conduit
232 Local collection conduit
240 Remote float or other mechanically actuated and controlled valve
241 Remote manually activated and controlled valve
242 Remote solenoid, motorized, or other electro-mechanically actuated and controlled valve
243 Collection network valve
244 Local collection valve
245 Prefilter vessel exit flow control valve
250 Vacuum/pressure gauge
300 Coalescer vessel
301 Removable coalescer vessel cover
302 Coalescer element
303 Flow rate limiting orifice
320 Differential pressure sensor
330 Drain conduit
340 Drain valve
341 Shut-off valve
342 Check valve
343 Metering valve
344 Self-closing quick disconnect
345 Siphon breaker
350 Vacuum/pressure gauge
400 Vacuum pump
420 Vacuum sensor
430 Vacuum pump inlet air conduit
431 Vacuum pump exhaust air conduit
432 Bi-directional air conduit
440 Self-closing check valve
441 Self-closing relief check valve
442 Solenoid relief valve
443 Vacuum regulating valve
450 Vacuum/pressure gauge
500 Light phase extraction and discharge pump
530 Light phase extraction and discharge pump suction conduit
540 Pressure relief valve
541 Check valve
542 Light phase extraction and discharge pump suction shut-off valve
543 Light phase extraction and discharge pump discharge shut-off valve
545 Siphon breaker
550 Vacuum/pressure gauge
600 Heavy phase extraction and discharge pump
630 Heavy phase extraction and discharge pump suction conduit
640 Pressure relief valve
641 Check valve
642 Heavy phase extraction and discharge pump suction shut-off valve
643 Heavy phase extraction and discharge pump discharge shut-off valve
650 Vacuum/pressure gauge
700 Light phase receptacle
720 Light phase receptacle liquid surface control level
720A Light phase receptacle liquid surface level sensor
730 Air vent conduit
760 Air vent conduit cap

DESCRIPTION OF THE INVENTION

FIG. 1 shows the basic process in flowchart form. More specifically, FIG. 1 shows:
An inflow stream, which typically contains mixed immiscible liquids, and might contain grit, sediment, particulates, floating debris, and/or air.
A grit, sediment, particulates, and floating debris removal stage, followed by an air removal stage, followed by an initial phase separation stage, followed by temporary storage stages for partially or totally separated light and heavy phases, respectively.

Optional intermediate separation stages for partially separated light and heavy phases, respectively.

Optional stages that trap light phase at the heavy phase intermediate separation stage, and that trap heavy phase at the light phase intermediate separation stage.

Terminal facilities for each respective separated phase.

Circled question marks, which indicate a choice in flow paths.

Figure 2:
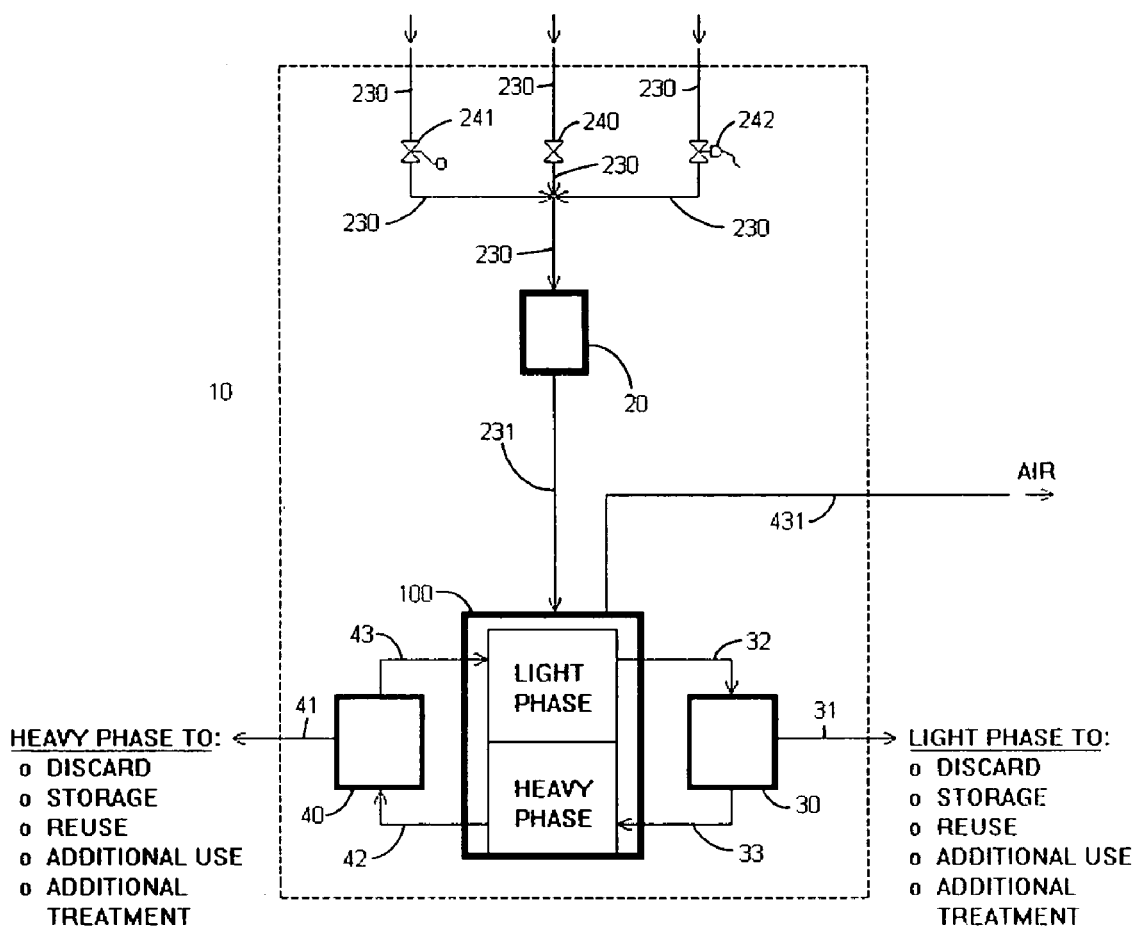
FIG. 2 shows major system components and general system flow patterns, and graphically depicts some of the many possible mixed immiscible liquids collection and separated phase discharge conduit options available. This figure is a partial schematic. This figure is not to scale.

FIG. 2 shows some of the main components of a Mixed Immiscible Liquids Vacuum, Separation, and Disposal Method and System (Mod 1) 10 in an embodiment that uses the optional intermediate phase separation stages mentioned in the paragraph above, together with the optional subdominant phase return lines exiting the intermediate predominant phase separation stages. One, or many, mixed immiscible liquids collection conduit(s) 230 connects to one or many mixed immiscible liquids sources through one or many, or any combination of, remote float or other mechanically actuated and controlled valves) 240, remote manually actuated and controlled valve(s) 241, and/or remote solenoid, motorized, or other electrically actuated and controlled valve(s) 242 through a grit, sediment, particulates, and floating debris collection/removal stage 20 and into a vacuum tank 100. As described further in the next paragraph below, grit, sediment, particulates, and floating debris collection/removal stage 20 is external to vacuum tank 100. Vacuum tank 100 further connects to an optional light phase intermediate separation stage 30 (i.e., the light phase is the predominant phase) via a partially treated light phase conduit 32 and a light phase intermediate separation stage heavy phase return conduit 33. Vacuum tank 100 further connects to an optional heavy phase intermediate separation stage 40 (i.e., the heavy phase is the predominant phase) via a partially treated heavy phase conduit 42 and a heavy phase intermediate separation stage light phase return conduit 43. A light phase discharge conduit 31 carries separated light phase liquid to any one or several optional terminal facilities. Likewise, a heavy phase discharge conduit 41 carries separated heavy phase liquid to any one of several optional terminal facilities. A vacuum pump exhaust air conduit 431 carries air extracted from vacuum tank 100.

Figure 3:
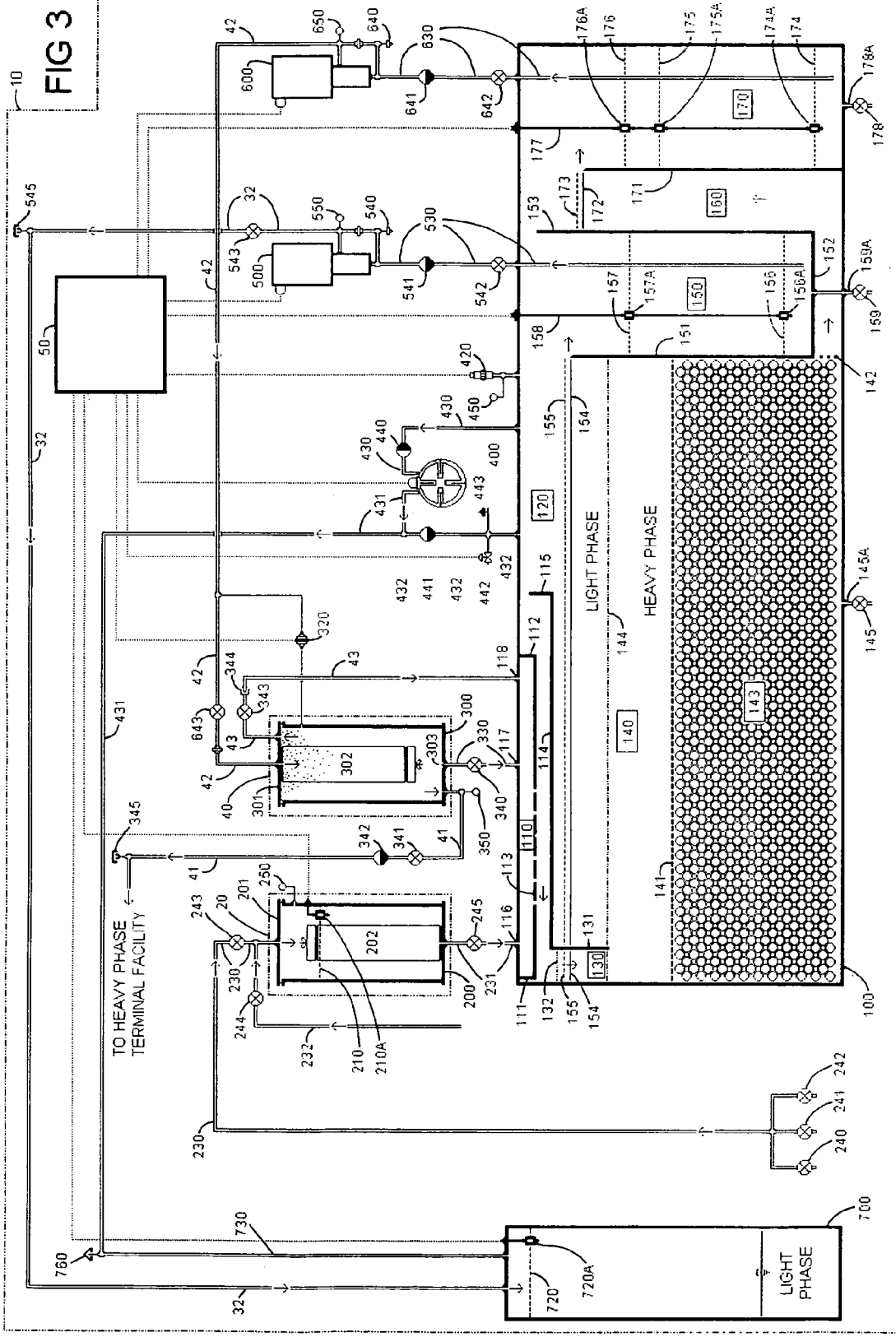
FIG. 3 is a total system schematic of the invention in single line form. While not to scale, it shows the relative positions of vacuum tank internal and connection details.

FIG. 3 shows many more details of the main Mixed Immiscible Liquids Vacuum, Separation, and Disposal Method and System (Mod 1) 10. FIG. 3 shows interior details of vacuum tank 100, as well as all the other components and features which contribute to Mixed Immiscible Liquids Vacuum, Separation, and Disposal Method and System (Mod 1) 10 operational performance.

Vacuum tank 100 is a closed, horizontally oriented, cylinder that is structurally capable of withstanding a 28 inch Mercury vacuum without imploding, and without deforming appreciably from its resting, atmospheric pressure-equalized, non-vacuum, condition. Vacuum tank 100 may also be oriented vertically, however, adjustments to many of the features and details described below, which apply to a horizontally oriented vacuum tank, will be necessary if a vertical vacuum tank is employed.

Inside vacuum tank 100 is an energy dissipation and flow distribution chamber 110, an air void 120, a separated light phase anti-disturbance chamber 130, a main gross phase separation chamber 140, a light phase sump 150, a heavy phase equalization chamber 160, and a heavy phase sump 170.

Energy dissipation and flow distribution chamber 110 is formed by the space enclosed by the curved interior upper surface of vacuum tank 100, an energy dissipation and flow distribution chamber left end plate 111, an energy dissipation and flow distribution chamber right end plate 112, and an energy dissipation and flow distribution chamber perforated bottom plate 113. Energy dissipation and flow distribution chamber left end plate 111 and energy dissipation and flow distribution chamber right end plate 112 are both relatively thin (say about ¼") and semicircular in shape. Energy dissipation and flow distribution chamber left end plate 111 and energy dissipation and flow distribution chamber right end plate 112 both orient vertically and feature a horizontal bottom edge and a curved top edge that matches the inside curvature of vacuum tank 100. Energy dissipation and flow distribution chamber perforated bottom plate 113 is relatively thin (say about ¼") and rectangular in shape. Energy dissipation and flow distribution chamber perforated bottom plate 113 orients horizontally. Energy dissipation and flow distribution chamber left end plate 111, energy dissipation and flow distribution chamber right end plate 112, and energy dissipation and flow distribution chamber perforated bottom plate 113 all attach continuously along their respective side edges to vacuum tank 100. The left edge of energy dissipation and flow distribution chamber perforated bottom plate 113 attaches continuously to the bottom edge of energy dissipation and flow distribution chamber left end plate 111. The right edge of energy dissipation and flow distribution chamber perforated bottom plate 113 attaches continuously to the bottom edge of energy dissipation and flow distribution chamber right end plate 111. The inside bottom surface of energy dissipation and flow distribution chamber perforated bottom plate 113 lies about ¾" below the crown of vacuum tank 100. A prefilter vessel outlet vacuum tank penetration 116, a coalescer vessel drain vacuum tank penetration 117, and a coalescer vessel trickle return line vacuum tank penetration 118 all penetrate vacuum tank 100 into energy dissipation and flow distribution chamber 110. Energy dissipation and flow distribution chamber perforated bottom plate 113 features 15 each ¼" diameter holes that are spaced in a 3"×2" on-center grid pattern of 3 columns of 5 holes and 5 rows of 3 holes. The total hole area in energy dissipation and flow distribution chamber perforated bottom plate 113 is about 1.5 times the net opening area of prefilter vessel outlet vacuum tank penetration 116.

Directly below energy dissipation and flow distribution chamber 110 is a separated light phase protection roof 114. Separated light phase protection roof 114 is relatively thin (say about ¼") and rectangular in shape. The top surface of separated light phase protection roof 114 orients horizontally about 1.5" below the bottom surface of energy dissipation and flow distribution chamber perforated bottom plate 113 to allow instream flow air elimination rightward above leftward flowing liquid along the top surface of separated light phase protection roof 114. A separated light phase protection roof right end plate 115 lies at the right end of separated light phase protection roof 114. Separated light phase protection roof right end plate 115 is relatively thin (say about ¼") and modified semi-circular in shape. Separated light phase protection roof right end plate 115 orients vertically and features horizontal top and bottom edges and curved left and right side edges that match the inside curvature of vacuum tank 100. The top edge of separated light phase protection roof right end plate 115 lies about 1" below the crown of vacuum tank 100, and about 3" to the right of energy dissipation and flow distribution chamber right end plate 112. Separated light phase protection roof right end plate 115 prevents liquid that exits energy dissipation and flow distribution chamber 110 from flowing rightward and falling through and disturbing any resting separated light phase in main gross phase separation chamber 140, while allowing the rightward flow of any entrained air. The side edges of separated light phase protection roof 114 attach continuously to vacuum tank 100. The right end edge of separated light phase protection roof 114 attaches continuously to the bottom edge of separated light phase protection roof right end plate 115. The side edges of separated light phase protection roof right end plate 115 attach continuously to vacuum tank 100.

Separated light phase anti-disturbance chamber 130 lies at the left end of vacuum tank 100 and slightly below the bottom surface of separated light phase protection roof 114. Separated light phase anti-disturbance chamber 130 is the space formed by the left end of vacuum tank 100, a dynamic inflow level 132, a separated light phase anti-disturbance baffle 131, the leftward horizontal projection of the bottom edge of separated light phase anti-disturbance baffle 131, and the curved interior surface of vacuum tank 100. Separated light phase anti-disturbance baffle 131 is relatively thin (say about ¼") and modified semi-circular in shape. Separated light phase anti-disturbance baffle 131 orients vertically and features horizontal top and bottom edges and curved left and right side edges that match the inside curvature of vacuum tank 100. The side edges of separated light phase anti-disturbance baffle 131 attach continuously to vacuum tank 100. The top edge of separated light phase anti-disturbance baffle 131 attaches continuously to the left edge of separated light phase protection roof 114. The clear width (i.e., gap) between the left end of vacuum tank 100 and separated light phase anti-disturbance baffle 131 is about 1.5". The bottom edge of separated light phase anti-disturbance baffle 131 lies below a light phase/heavy phase interface 144. Dynamic inflow level 132 establishes above a light phase sump weir dynamic level 155 when liquid flows into vacuum tank 100.

Main gross phase separation chamber 140 is formed by space enclosed by the curved interior surface of vacuum tank 100, the left end of vacuum tank 100, a light phase sump left plate 151 and its downward vertical projection to the inside surface of vacuum tank 100, and a light phase sump weir static level 154, minus separated light phase anti-disturbance chamber 130. The minimum volume of main gross phase separation chamber 140, as measured in gallons, compared to the maximum design inflow rate, as measured in gallons per minute, should represent a ratio of about 10:1, together with maximum separation of the bottom of separated light phase anti-disturbance chamber 130 to the entrance of heavy phase equalization chamber 160, which, in this combination, accommodates the desired detention time of a molecule of heavy phase liquid in main gross phase separation chamber 140 to about 10 minutes, assuming that plug flow conditions occur in main gross phase separation chamber 140. The minimum horizontal clear distance (i.e., gap) between separated light phase anti-disturbance baffle 131 and light phase sump left plate 151 to ensure that discrete light phase that enters main gross phase separation chamber 140 from separated light phase anti-disturbance chamber 130, and/or to ensure that light phase droplets that form and ascend in main gross phase separation chamber 140, have sufficient time (about one (1) minute) to totally separate from the heavy phase in main gross phase separation chamber 140 and to join floating light phase in main gross phase separation chamber 140 without carrying heavy phase from main gross phase separation chamber 140 into a light phase sump 150 when light phase flows into light phase sump 150 can be estimated by the following formula:

$$G_{min}=(231 \times Q)/(D \times L)$$

Where:
$G_{min}$=Gap, minimum, measured in inches
Q=Maximum design flow rate in a prefilter vessel exit conduit 231, measured in gallons per minute
D=Depth of light phase, measured in inches (also the vertical distance between light phase sump weir static level 154 and light phase/heavy phase interface 144)
L=Length of weir span (also length of top edge of light phase sump left plate 151), measured in inches An optional (recommended if the heavy phase is water or seawater, and if the light phase is an oil) perforated oleophilic media containment plate 141 lies inside main gross phase separation chamber 140. Perforated oleophilic media containment plate 141 is relatively thin (say about ¼") and rectangular in shape. The top surface of perforated oleophilic media containment plate 141 orients horizontally about 7.5" below separated light phase protection roof 114 and about 2" below light phase/heavy phase interface 144. The holes in perforated oleophilic media containment plate 141 are slightly smaller than the smallest dimension of a quantity of oleophilic media 143. Perforated oleophilic media containment plate 141 features holes in sufficient quantity so that liquid flow down, or up, in main gross phase separation chamber 140 occurs unimpeded, while maintaining adequate structural strength and rigidity to prevent oleophilic media 143 from floating above the horizontal plane established by perforated oleophilic media containment plate 141. The sides of perforated oleophilic media containment plate 141 attach to vacuum tank 100. The left edge of perforated oleophilic media containment plate 141 lies close to the left end of vacuum tank 100, but no further than the smallest dimension of oleophilic media 143. The right edge of perforated oleophilic media containment plate 141 lies close to light phase sump left plate 151, but no further than the smallest dimension of oleophilic media 143. An oleophilic media containment bar(s) 142 lie(s) directly below light phase sump left plate 151. Oleophilic media containment bar(s) 142 is/are sufficiently rigid to prevent oleophilic media 143 from entering heavy phase equalization chamber 160, and is/are sized and spaced to minimize heavy phase flow head loss from main gross phase separation chamber 140 into heavy phase equalization chamber 160. A quantity of oleophilic media 143 fills the space in main gross phase separation chamber 140 below perforated oleophilic media containment plate 141. The ratio of oleophilic media 143, measured in cubic feet, to the throughput of Mixed Immiscible Liquids Vacuum, Separation, and Disposal Method and System (Mod 1) 10, measured in gallons per minute, should be no less than 0.6:1. A drain valve 145 connects to a drain conduit 145A, which penetrates and attaches to, the bottom of main gross phase separation chamber 140.

Light phase sump 150 lies immediately to the right of main gross phase separation chamber 140. Light phase sump 150 is formed by the curved interior surface of vacuum tank 100, light phase sump left plate 151, a light phase sump bottom plate 152, a light phase sump right plate 153, and the rightward horizontal projection of the top edge of light phase sump left plate 151 to its intersection with light phase sump right plate 153. Light phase sump left plate 151, light phase sump right plate 153, and light phase sump right plate 153 are all relatively thin (say about ¼"). Light phase sump left plate 151 and light phase sump right plate 153 both orient vertically and both are modified semi-circular in shape. Light phase sump right plate 153 is taller than light phase sump left plate 151. Light phase sump left plate 151 and light phase sump right plate 153 both feature horizontal top and bottom edges and curved left and right side edges that match the inside curvature of vacuum tank 100. Light phase sump bottom plate 152 orients horizontally and is rectangular in shape. The top edge of light phase sump left plate 151 establishes and corresponds to light phase sump weir static level 154. The top edge of light phase sump left plate 151 lies about 3¼" below the crown of vacuum tank 100. Light phase sump weir dynamic level 155 establishes horizontally above, or at, light phase sump weir static level 154 when liquid flows into vacuum tank 100. The curved side edges of both light phase sump left plate 151 and light phase sump right plate 153 attach continuously to vacuum tank 100, and to the left end edge and right end edge of light phase sump bottom plate 152, respectively. The sides of light phase sump bottom plate 152 attach continuously to vacuum tank 100. The bottom surface of light phase sump bottom plate 152 is about 2¼" above the invert of vacuum tank 100. The horizontal clear distance between light phase sump left plate 151 and light phase sump right plate 153 is about 6¾". A light phase sump lower liquid surface control level 156 is established inside light phase sump 150 about 2¼" above the top surface of light phase sump bottom plate 152. A light phase sump upper liquid surface control level 157 is established inside light phase sump 150 about 10" above light phase sump lower liquid surface control level 156, and about 4¾" below light phase sump weir static level 154. A light phase sump lower liquid surface level sensor 156A, which slides vertically along a light phase sump liquid level sensor guide rod 158 between two limit stops, which restrict the vertical movement of light phase sump lower liquid surface level sensor 156A, controls light phase sump lower liquid surface control level 156. A light phase sump upper liquid surface level sensor 157A, which slides vertically along light phase sump liquid level sensor guide rod 158 between two limit stops, which restrict the vertical movement of a light phase sump upper liquid surface level sensor 157A, controls light phase sump upper liquid surface control level 157. Light phase sump lower liquid surface level sensor 156A and light phase sump upper liquid surface level sensor 157A are both selected to float when only partially immersed in the light phase. The volume represented by the space between light phase sump lower liquid surface control level 156 and light phase sump upper liquid surface control level 157 inside light phase sump 150 should preclude short-cycling (e.g., more than one on-off cycle per minute) of a light phase extraction and discharge pump 500. The top edge of light phase sump right plate 153 lies about 1¼" above light phase sump weir static level 154 and about 2" below the crown of vacuum tank 100. Light phase sump 150 is liquid tight. A drain valve 159 connects to a drain conduit 159A, which penetrates through the wall of vacuum tank 100 and passes through the lower section of heavy phase equalization chamber 160 and penetrates and attaches to light phase sump bottom plate 152.

Heavy phase equalization chamber 160 lies under, and to the right of, light phase sump 150. Heavy phase equalization chamber 160 is formed by the curved interior surface of vacuum tank 100, light phase sump bottom plate 152, the downward vertical projection of light phase sump left plate 151 to the inside surface of vacuum tank 100, a heavy phase sump left plate 171, and the leftward horizontal projection of the top edge of heavy phase sump left plate 171 to its intersection with the vertical surface of light phase sump right plate 153. The top edge of heavy phase sump left plate 171 establishes and corresponds to a heavy phase sump weir static level 172. A heavy phase sump weir dynamic level 173 establishes horizontally above, or at, heavy phase sump weir static level 172 when liquid flows into vacuum tank 100.

Heavy phase sump 170 lies immediately to the right of heavy phase equalization chamber 160. Heavy phase sump 170 is formed by the curved interior surface of vacuum tank 100, heavy phase sump left plate 171, the right end of vacuum tank 100, and the rightward horizontal projection of the top edge of heavy phase sump left plate 171 to its intersection with the right end of vacuum tank 100. Heavy phase sump left plate 171 is relatively thin (say about ¼") and is semi-circular in shape. Heavy phase sump left plate 171 orients vertically and features a horizontal top edge and a curved side edge that matches the inside curvature of vacuum tank 100. The top edge of heavy phase sump left plate 171 establishes and corresponds to heavy phase sump weir static level 172. The curved side edge of heavy phase sump left plate 171 attaches continuously to vacuum tank 100. The horizontal clear distance between heavy phase sump left plate 171 and the right end of vacuum tank 100 is about 8". A heavy phase sump lower liquid surface control level 174 is established inside heavy phase sump 170 about 2¾" above the bottom of heavy phase sump 170. A heavy phase sump middle liquid surface control level 175 is established inside heavy phase sump 170 about 10¼" above heavy phase sump lower liquid surface control level 174. A heavy phase sump upper liquid surface control level 176 is established inside heavy phase sump 170 about 3" above heavy phase sump middle liquid surface control level 175, and about 3¼" below heavy phase sump weir static level 172. A heavy phase sump lower liquid surface level sensor 174A, which slides vertically along a heavy phase sump liquid level sensor guide rod 177 between two limit stops, which restrict the vertical movement of heavy phase sump lower liquid surface level sensor 174A, controls heavy phase sump lower liquid surface control level 174. A heavy phase sump middle liquid surface level sensor 175A, which slides vertically along light phase sump liquid level sensor guide rod 177 between two limit stops, which restrict the vertical movement of heavy phase sump middle liquid surface level sensor 175A, controls heavy phase sump middle liquid surface control level 175. A heavy phase sump upper liquid surface level sensor 176A, which slides vertically along light phase sump liquid level sensor guide rod 177 between two limit stops, which restrict the vertical movement of heavy phase sump upper liquid surface level sensor 176A, controls heavy phase sump upper liquid surface control level 176. Heavy phase sump lower liquid surface level sensor 174A, heavy phase sump middle liquid surface level sensor 175A, and heavy phase sump upper liquid surface level sensor 176A are all selected to float when only partially immersed in the heavy phase. The volume represented by the space between heavy phase sump lower liquid surface control level 174 and heavy phase sump middle liquid surface control level 175 inside heavy phase sump 170 should preclude short-cycling (e.g., more than one on-off cycle per minute) of a heavy phase extraction and discharge pump 600. Heavy phase sump upper liquid surface control level 176, in combination with the air flow rating of a solenoid relief valve 442 that purges the negative pressure from vacuum tank 100, should be sufficiently below heavy phase sump weir static level 172 to preclude inadvertent entry of any heavy phase liquid over the top edge of light phase sump left plate 151 into light phase sump 150, which might occur if the liquid surface level in heavy phase sump 170 rises above the top edge of heavy phase sump left plate 171. The top edge of heavy phase sump left plate 171 lies about 0.5" below the top edge of light phase sump left plate 151 and about 3¾" below the crown of vacuum tank 100. Heavy phase sump 170 is liquid tight. The volume in heavy phase sump 170 between heavy phase sump lower liquid surface control level 174 and the rightward horizontal extension of heavy phase sump weir static level 172 should be greater than the volume of a coalescer vessel 300. A drain valve 178 connects to a drain conduit 178A, which penetrates and attaches to the bottom of heavy phase sump 170.

To ensure the proper operation of Mixed Immiscible Liquids Vacuum, Separation, and Disposal Method and System (Mod 1) 10, the top surface of separated light phase protection roof 114 must lie above dynamic inflow level 132, and light phase sump weir static level 154 must lie above heavy phase sump weir dynamic level 173. Establishing these levels depends on three criteria:

1. The maximum inflow rate into vacuum tank 100 through prefilter vessel exit conduit 231, and
2. The top edge span lengths of separated light phase anti-disturbance baffle 131 (which is also the left end span length of separated light phase protection roof 114), light phase sump left plate 151, and heavy phase sump left plate 171, which all act as overflow weirs into separated light phase anti-disturbance chamber 130, light phase sump 150, and heavy phase sump 170, respectively, and
3. Manufacturing tolerances to establish horizontal top edges on separated light phase anti-disturbance baffle 131, light phase sump left plate 151, and heavy phase sump left plate 171.

The following formula will derive approximate heavy phase sump weir dynamic level 173 above heavy phase sump weir static level 172 for a given top edge span length of heavy phase sump left plate 171, and approximate light phase sump weir dynamic level 155 above light phase sump weir static level 154 for a given top edge span length of light phase sump left plate 151, respectively:

$$H = (12) \times [(Q)/(124.5) \times (L)]^{2/3}$$

Where:
H=Dynamic level above the weir, measured in inches
Q=Flow rate in prefilter vessel exit conduit 231, measured in gallons per minute
L=Length of weir span (same as the length of the top edge of the respective sump left plate), measured in inches As discussed above, the bottom edge of separated light phase anti-disturbance baffle 131 must lie below light phase/heavy phase interface 144 to preclude disturbance of any floating light phase that lies rightward of separated light phase anti-disturbance baffle 131. Once light phase sump weir static level 154 and heavy phase sump weir static level 172 are established, the vertical distance from light phase sump weir static level 154 to light phase/heavy phase interface 144 will derive based on the specific gravities of the light phase liquid and heavy phase liquid using the following formula:

$$D_{LP} = [(W_{LP,STATIC}) - (W_{HP,STATIC})]/[1 - (SG_{LP}/SG_{HP})]$$

Where:
$D_{LP}$=Depth of floating light phase, measured in inches, between light phase sump weir static level 154 and light phase/heavy phase interface 144
$W_{LP,STATIC}$=Weir elevation, light phase, static, measured in inches, also light phase sump weir static level 154
$W_{HP,STATIC}$=Weir elevation, heavy phase, static, measured in inches, also heavy phase sump weir static level 172
$SG_{LP}$=Specific Gravity, light phase
$SG_{HP}$=Specific Gravity, heavy phase The bottom edge of separated light phase anti-disturbance baffle 131 should be about ¼" lower than light phase/heavy phase interface 144.

Air void 120 is all space inside vacuum tank 100 that is not otherwise delimited as energy dissipation and flow distribution chamber 110, separated light phase anti-disturbance chamber 130, main gross phase separation chamber 140, light phase sump 150, heavy phase equalization chamber 160, or heavy phase sump 170.

A prefilter vessel 200 provides the functions of grit, particulates, and floating debris removal stage 20. Prefilter vessel exit conduit 231 connects the bottom of prefilter vessel 200 to energy dissipation and flow distribution chamber 110. One, or many, mixed immiscible liquids collection conduit(s) 230 connect(s) prefilter vessel 200 to a remote, float or other mechanically actuated and controlled valve(s) 240, to a remote manually activated and controlled valve(s) 241, and/or to a remote, solenoid, motorized, or other electro-mechanically actuated and controlled valve(s) 242. Mixed immiscible liquids collection conduit(s) 230 cross-sectional area(s) is/are sized to accommodate a design Mixed Immiscible Liquids Vacuum, Separation, and Disposal Method and System (Mod 1) 10 inflow rate no more than about 2 ft/sec to minimize liquid inflow stream turbulence and agitation. A local collection conduit 232 connects to prefilter vessel 200. A prefilter vessel exit flow control valve 245 inserts and installs into prefilter vessel exit conduit 231 between prefilter vessel 200 and energy dissipation and flow distribution chamber 110. A collection network valve 243 inserts and installs into mixed immiscible liquids collection conduit 230 between prefilter vessel prefilter vessel and remote, float or other mechanically actuated and controlled valve(s) 240, remote manually activated and controlled valve(s) 241, and/or remote, solenoid, motorized, or other electro-mechanically actuated and controlled valve (s) 242. A local collection valve 244 inserts and installs into local collection conduit 232. Local collection valve 244 is sized to limit the maximum collection flow rate through local collection conduit 232 to the maximum design inflow rate of Mixed Immiscible Liquids Vacuum, Separation, and Disposal Method and System (Mod 1) 10. Prefilter vessel 200 features a prefilter element 202 and a removable prefilter vessel cover 201. Prefilter element 202 mounts to the bottom of prefilter vessel 200 and is replaceable. Prefilter element 202 is a standard filter cartridge element or strainer preferably featuring passages no larger than 1 mm. A vacuum/pressure gauge 250 connects to prefilter vessel 200. A prefilter vessel high liquid surface control level 210 is established inside prefilter vessel 200 near the top of prefilter element 202. A prefilter vessel high liquid surface level sensor 210A controls prefilter vessel high liquid surface control level 210. Both mixed immiscible liquids collection conduit 230 and local collection conduit 232 connect to prefilter vessel 200 above prefilter vessel high liquid surface control level 210. If prefilter vessel 200 mounts on top of vacuum tank 100 in its preferred vertical orientation as shown, then the bottom front of prefilter vessel 200 can be articulated to its mounting (e.g., by a hinge, not shown) together with a tilt restraining device (e.g., by a chain, also not shown) to enable operators to tilt prefilter vessel 200 towards them to facilitate prefilter element 202 replacement.

Coalescer vessel 300 provides the functions of heavy phase intermediate separation stage 40. A drain conduit 330 connects the bottom of coalescer vessel 300 to energy dissipation and flow distribution chamber 110. Heavy phase discharge conduit 41 connects the heavy phase terminal facility to the bottom of coalescer vessel 300. Partially treated heavy phase conduit 42 connects light phase extraction and discharge pump 500 to coalescer vessel 300. Heavy phase intermediate separation stage light phase return conduit 43 connects the top of coalescer vessel 300 to energy dissipation and flow distribution chamber 110. A check valve 342, a shut-off valve 341, and a siphon breaker 345 all insert and install into heavy phase discharge conduit 41 between coalescer vessel 300 and the heavy phase terminal facility. Siphon breaker 345 lies downstream of check valve 342. A drain valve 340 inserts and installs into drain conduit 330 between coalescer vessel 300 and to energy dissipation and flow distribution chamber 110. Drain valve 340 is sized to limit the maximum drainage flow rate through drain conduit 330 to the maximum design inflow rate of Mixed Immiscible Liquids Vacuum, Separation, and Disposal Method and System (Mod 1) 10. Alternatively, a flow rate limiting orifice 303 that inserts directly into drain conduit 330, or that inserts at the connection of drain conduit 330 to coalescer vessel 300, or that inserts at the connection of drain conduit 330 to energy dissipation and flow distribution chamber 110, that also limits the maximum drainage flow rate through drain conduit 330 to the maximum design inflow rate of Mixed Immiscible Liquids Vacuum, Separation, and Disposal Method and System (Mod 1) 10, will nullify the aforementioned drain valve 340 sizing requirement. A metering valve 343 and a self-closing quick disconnect 344 insert and install into heavy phase intermediate separation stage light phase return conduit 43 between coalescer vessel 300 and energy dissipation and flow distribution chamber 110. Coalescer vessel 300 features a coalescer element 302 and a removable coalescer vessel cover 301. Coalescer element 302 mounts to the bottom of coalescer vessel cover 301 and is replaceable. A vacuum/pressure gauge 350 connects to coalescer vessel 300. A differential pressure sensor 320 connects between coalescer vessel 300 and partially treated heavy phase conduit 42 upstream of a heavy phase extraction and discharge pump discharge shut-off valve 643. Siphon breaker 345 lies above the top of coalescer vessel 300 to ensure that coalescer vessel 300 remains full during Mixed Immiscible Liquids Vacuum, Separation, and Disposal Method and System (Mod 1) 10 operation, which will ensure the desirable purging of any light phase that separates in coalescer vessel 300 through heavy phase intermediate separation stage light phase return conduit 43. If coalescer vessel 300 mounts on top of vacuum tank 100 in its preferred vertical orientation as shown, then the bottom front of coalescer vessel 300 can be articulated to its mounting (e.g., by a hinge, not shown) together with a tilt restraining device (e.g., by a chain, also not shown) to enable operators to tilt coalescer vessel 300 towards them to facilitate coalescer element 302 replacement.

The inlet of a vacuum pump 400 connects through a vacuum pump inlet air conduit 430 to the top of air void 120 at a point that is well above light phase sump weir static level 154 and that is well rightward of separated light phase protection roof right end plate 115. The exhaust of vacuum pump 400 connects through vacuum pump exhaust air conduit 431 to an air vent conduit 730, which connects to a light phase receptacle 700 and to an air vent conduit cap 760. A bi-directional air conduit 432 connects vacuum pump exhaust air conduit 431 to the top of air void 120. Bi-directional air conduit 432 penetrates and connects air void 120 at a point that is well above light phase sump weir static level 154 and that is well rightward of separated light phase protection roof right end plate 115. A self-closing check valve 440 inserts and installs in vacuum pump inlet air conduit 430 between vacuum pump 400 and air void 120. Self-closing check valve 440 allows air flow in one direction from air void 120 to vacuum pump 400. A self-closing relief check valve 441 inserts and installs in bi-directional air conduit 432 between air void 120 and the connection of vacuum pump exhaust air conduit 431 to bi-directional air conduit 432. Self-closing relief check valve 441 may, alternatively, also connect, into vacuum pump exhaust air conduit 431 downstream of vacuum pump 400 and into vacuum pump inlet air conduit 430 upstream of self-closing check valve 440. In this alternative configuration self-closing relief check valve 441 is effectively in parallel with self-closing check valve 440 and vacuum pump 400. Self-closing relief check valve 441 allows air flow in one direction from air void 120 to vacuum pump exhaust air conduit 431. The cracking pressure of self-closing relief check valve 441 is relatively low, say less than 0.5 pounds per square inch gauge.

A vacuum sensor 420, solenoid relief valve 442, a vacuum regulating valve 443, and a vacuum/pressure gauge 450 all connect, directly and/or indirectly, to vacuum tank 100 using a variety of methods and configurations. Vacuum sensor 420, solenoid relief valve 442, vacuum regulating valve 443, and vacuum/pressure gauge 450 may all be mounted in a variety of positions. Preferably, neither vacuum sensor 420, solenoid relief valve 442, vacuum regulating valve 443, nor vacuum/pressure gauge 450 should connect to vacuum tank 100 so that any liquid can contaminate their respective internal parts.

The inlet of light phase extraction and discharge pump 500 connects through a light phase extraction and discharge pump suction conduit 530 into light phase sump 150. Light phase extraction and discharge pump suction conduit 530 terminates at its lower end about 1" below light phase sump lower liquid surface control level 156. A light phase extraction and discharge pump suction shut-off valve 542 and a check valve 541 insert and install into light phase extraction and discharge pump suction conduit 530 upstream of light phase extraction and discharge pump 500. The outlet of light phase extraction and discharge pump 500 connects through partially treated light phase conduit 32 to light phase receptacle 700. A siphon breaker 545 inserts and installs in partially treated light phase conduit 32 between light phase extraction and discharge pump 500 and light phase receptacle 700. A light phase extraction and discharge pump discharge shut-off valve 543 inserts and installs in partially treated light phase conduit 32 between siphon breaker 545 and light phase extraction and discharge pump 500. A pressure relief valve 540 inserts and installs into light phase extraction and discharge pump suction conduit 530 downstream of check valve 541 and into partially treated light phase conduit 32 upstream of light phase extraction and discharge pump discharge shut-off valve 543. A vacuum/pressure gauge 550 connects to partially treated light phase conduit 32 upstream of light phase extraction and discharge pump discharge shut-off valve 543.

The inlet of heavy phase extraction and discharge pump 600 connects through a heavy phase extraction and discharge pump suction conduit 630 into heavy phase sump 170. Heavy phase extraction and discharge pump suction conduit 630 terminates at its lower end about 1" below heavy phase sump lower liquid surface control level 174. A heavy phase extraction and discharge pump suction shut-off valve 642 and a check valve 641 insert and install into heavy phase extraction and discharge pump suction conduit 630 upstream of heavy phase extraction and discharge pump 600. The outlet of heavy phase extraction and discharge pump 600 connects through partially treated heavy phase conduit 42 to coalescer vessel 300. Heavy phase extraction and discharge pump discharge shut-off valve 643 inserts and installs in partially treated heavy phase conduit 42 between coalescer vessel 300 and heavy phase extraction and discharge pump 600. A pressure relief valve 640 inserts and installs into heavy phase extraction and discharge pump suction conduit 630 downstream of check valve 641 and into partially treated heavy phase conduit 42 upstream of heavy phase extraction and discharge pump discharge shut-off valve 643. A vacuum/pressure gauge 650 connects to partially treated heavy phase conduit 42 upstream of heavy phase extraction and discharge pump discharge shut-off valve 643.

Light phase receptacle 700 serves as the light phase terminal facility. A light phase receptacle liquid surface control level 720 is established inside light phase receptacle 700 near the top of light phase receptacle 700. A light phase receptacle liquid surface level sensor 720A controls light phase receptacle liquid surface control level 720. Light phase receptacle liquid surface level sensor 720A is selected to float when only partially immersed in the light phase.

Light phase receptacle liquid surface level sensor 720A, prefilter vessel high liquid surface level sensor 210A, differential pressure sensor 320, solenoid relief valve 442, vacuum sensor 420, vacuum pump 400, light phase extraction and discharge pump 500, heavy phase extraction and discharge pump 600, light phase sump lower liquid surface level sensor 156A, light phase sump upper liquid surface level sensor 157A, heavy phase sump lower liquid surface level sensor 174A, heavy phase sump middle liquid surface level sensor 175A, and heavy phase sump upper liquid surface level sensor 176A all connect electrically to an electrical/logic panel 50.

Figure 4:
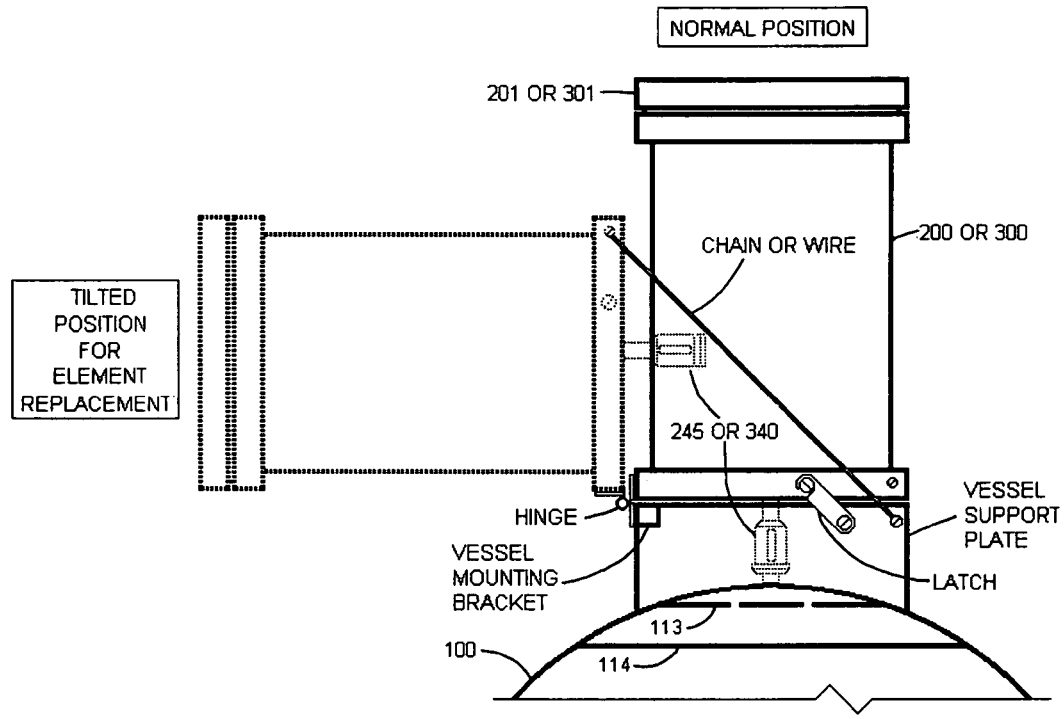
FIG. 4 is a partial cross-sectional elevation through the top of the invention in its preferred embodiment with the prefilter vessel (or the coalescer vessel) oriented vertically above the vacuum tank that shows the recommended prefilter (or coalescer) vessel base articulation option to facilitate element replacement by using a standard hinge and chain or wire to limit vessel tilt.

FIG. 4 shows the above mentioned/recommended prefilter vessel 200, and/or coalescer vessel 300, base articulation option that facilitates element replacement by using a standard hinge and a chain (or wire) restraint that limits vessel tilt. The hinge top plate attaches at the front edge of the base of prefilter vessel 200 or coalescer vessel 300. The hinge bottom plate attaches to the front edge of the vessel mounting bracket. This figure is not to scale.

Figure 5:
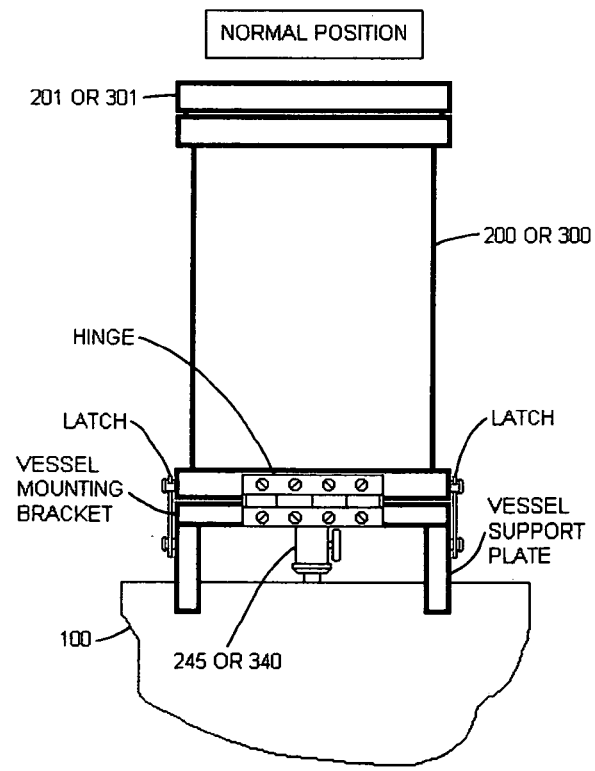
FIG. 5 is a partial elevation of the front of the invention in its preferred embodiment with the prefilter vessel (or the coalescer vessel) oriented vertically above the vacuum tank that also shows the recommended prefilter (or coalescer) vessel base articulation option to facilitate element replacement by using a standard hinge.

FIG. 5 is FIG. 4 rotated counterclockwise 90 degrees about its vertical axis. This figure is not to scale.

Figure 6:
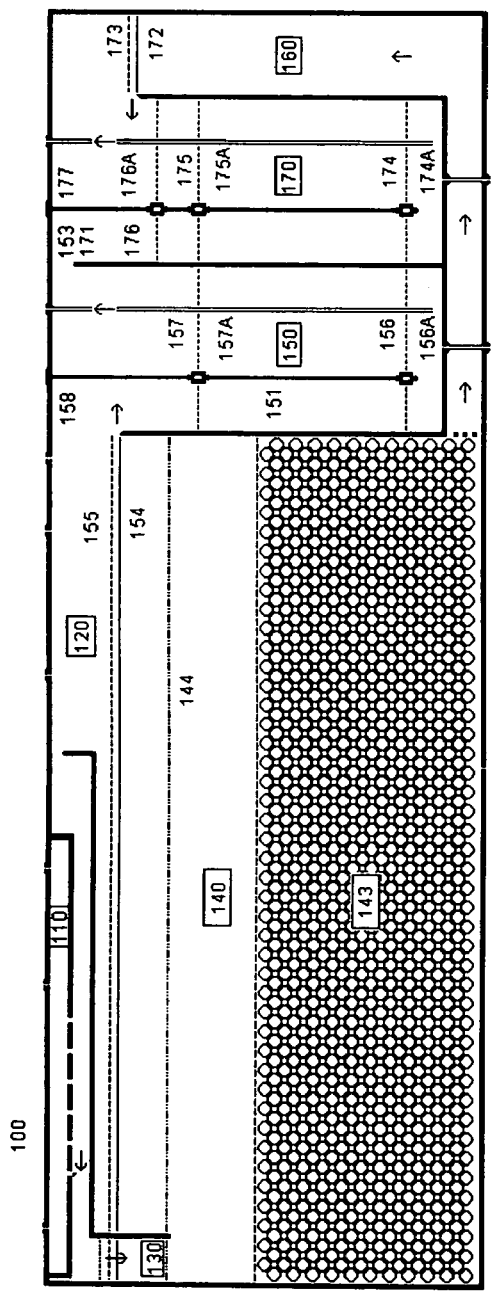
FIG. 6 and FIG. 7 are both cross-sectional elevations of the vacuum tank only that show alternative configurations of the light phase sump, the heavy phase sump, and the heavy phase equalization chamber. This figure is not to scale.
Figure 7:
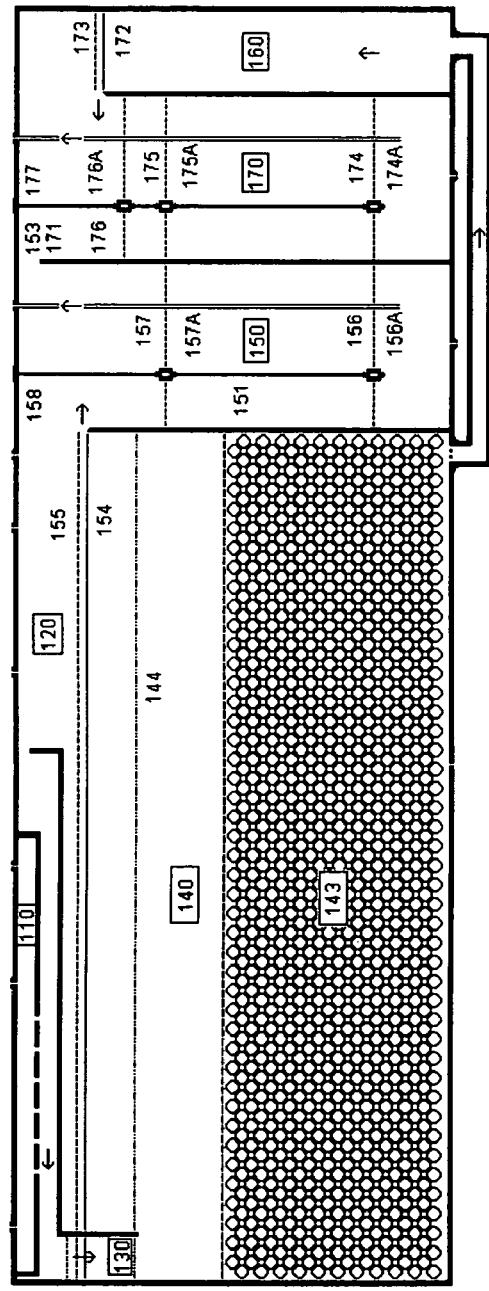

FIG. 6 and FIG. 7 both show vacuum tank 100 (only) in an alternative configuration for light phase sump 150, heavy phase equalization chamber 160, and heavy phase sump 170. Most of the details from FIG. 3 are repeated, but some are intentionally omitted for clarity. These figures are not to scale.

FIG. 8 through FIG. 15 all show vacuum tank 100, main gross phase separation chamber 140, light phase sump 150, heavy phase equalization chamber 160, and heavy phase sump 170 in several different possible relational configuration cross-sectional plan schematics through vacuum tank 100 that will perform the primary phase separation and local storage functions mentioned above. Note that light phase sump 150 must always adjoin, at least partially, main gross phase separation chamber 140, heavy phase sump 170 must always adjoin, at least partially, heavy phase equalization chamber 160, and heavy phase equalization chamber 160 must always connect to main gross phase separation chamber 140. These figures are not to scale.

OPERATION OF THE INVENTION

Referring to FIG. 1, upon initial entry into Mixed Immiscible Liquids Vacuum, Separation, and Disposal Method and System (Mod 1) 10, any grit, sediment, particulates, and floating debris contained in the inflow stream are first eliminated from the inflow stream. Next, any entrained air in the inflow stream is eliminated from the inflow stream. Mixed immiscible liquids then flow to an initial phase separation stage, whereupon each respective partially or totally separated phase is then temporarily stored. From temporary storage, each respective partially or totally separated phase then flows to either a(n) optional intermediate separation stage(s) or to its respective terminal facility. If a(n) optional intermediate separation stage(s) is/are used, then the predominant phase exiting the intermediate separation stage(s) may either flow to its respective terminal facility or return to temporary storage, joining its respective phase. If a(n) optional intermediate separation stage(s) is/are used, then the subdominant phase flowing from that particular intermediate separation stage can either flow to its respective predominant intermediate separation stage or to its terminal facility, can return to temporary storage, joining its respective phase, or can be locally trapped at the intermediate separation stage. The inflow stream into Mixed Immiscible Liquids Vacuum, Separation, and Disposal Method and System (Mod 1) 10 can be continuous or intermittent with absolutely no adverse affect on Mixed Immiscible Liquids Vacuum, Separation, and Disposal Method and System (Mod 1) 10 performance.

Referring to FIG. 2, vacuum tank 100 is under a constant, automatically regulated vacuum. The air from vacuum tank 100 exhausts through vacuum pump exhaust air conduit 431. Mixed immiscible liquids from their respective sources will flow in mixed immiscible liquids collection conduit(s) 230 towards vacuum tank 100 when any combination or number of remote manually activated and controlled valve(s) 241, remote float or other mechanically actuated and controlled valve(s) 240, or remote solenoid, motorized, or other electro-mechanically actuated and controlled valve(s) 242 open (s). Mixed immiscible liquids flow will continue as long as any remote manually activated and controlled valve(s) 241, remote float or other mechanically actuated and controlled valve(s) 240, or remote solenoid, motorized, or other electro-mechanically actuated and controlled valve(s) 242 remain(s) open. Mixed immiscible liquids, once inside mixed immiscible liquids collection conduit(s) 230, proceeds to grit, particulates, and floating debris removal stage 20, where grit, sediment, particulates, and/or floating debris is removed from the mixed immiscible liquids inflow stream. Mixed immiscible liquids flow then continues from grit, particulates, and floating debris removal stage 20 in prefilter vessel exit conduit 231 into vacuum tank 100, where any air entrained in the mixed immiscible liquids inflow stream is removed from the mixed immiscible liquids inflow stream. Initial phase separation of the mixed immiscible liquids also occurs in vacuum tank 100 through inherent immiscibility and specific gravity differences of the mixed immiscible liquids when resting in a relatively static, quiescent, temporary storage condition. In addition, low grade dissolved air flotation induced by the constant vacuum in vacuum tank 100 enhances initial gravity separation.

The partially separated heavy phase from vacuum tank 100 flows to heavy phase intermediate separation stage 40 through partially treated heavy phase conduit 42. Light phase liquids separated by heavy phase intermediate separation stage 40 return to vacuum tank 100 through heavy phase intermediate separation stage light phase return conduit 43, joining any pre-existent separated light phases at the top of vacuum tank 100. Heavy phases further separated by heavy phase intermediate separation stage 40 flow through heavy phase discharge conduit 41 to its respective terminal facility(s).

The partially separated light phase from vacuum tank 100 flows to light phase intermediate separation stage 30 through partially treated light phase conduit 32. Heavy phase liquids separated by light phase intermediate separation stage 30 return to vacuum tank 100 through light phase intermediate separation stage heavy phase return conduit 33, joining any pre-existent separated heavy phases at the bottom of vacuum tank 100. Light phases further separated by light phase intermediate separation stage 30 flow through light phase discharge conduit 31 to its respective terminal facility(s).

Referring to FIG. 3, electrical/logic panel 50 is energized. The control switches (not shown) for vacuum pump 400, light phase extraction and discharge pump 500, and heavy phase extraction and discharge pump 600 are all in the "automatic" position.

The following valves are normally open: collection network valve 243, prefilter vessel exit flow control valve 245, shut-off valve 341, metering valve 343, light phase extraction and discharge pump suction shut-off valve 542, light phase extraction and discharge pump discharge shut-off valve 543, heavy phase extraction and discharge pump suction shut-off valve 642, and heavy phase extraction and discharge pump discharge shut-off valve 643.

The following valves are normally closed: drain valve 145, drain valve 159, drain valve 178, remote float or other mechanically actuated and controlled valve 240, remote manually activated and controlled valve 241, remote solenoid, motorized, or other electro-mechanically actuated and controlled valve 242, local collection valve 244, and drain valve 340.

Heavy phase exists in vacuum tank 100 up to heavy phase sump weir static level 172. Vacuum sensor 420, light phase receptacle liquid surface level sensor 720A, light phase sump upper liquid surface level sensor 157A, and heavy phase sump middle liquid surface level sensor 175A controls vacuum pump 400 through electrical/logic panel 50. Vacuum pump 400 runs whenever the vacuum intensity in vacuum tank 100 is less than the vacuum intensity control setting of vacuum sensor 420, provided also that the liquid surface level free surface in light phase receptacle(s) 700 is below light phase receptacle liquid surface control level 720 as sensed by light phase receptacle liquid surface level sensor 720A, and provided that the liquid free surface in light phase sump 150 is below light phase sump upper liquid surface control level 157 as sensed by light phase sump upper liquid surface level sensor 157A, and provided that the liquid free surface in heavy phase sump 170 is below heavy phase sump middle liquid surface control level 175 as sensed by heavy phase sump middle liquid surface level sensor 175A. Vacuum pump 400 does not run whenever the vacuum intensity in vacuum tank 100 matches, or is higher than, the vacuum intensity setting of vacuum sensor 420, nor whenever the liquid free surface(s) in light phase receptacle(s) 700 is at, or above, light phase receptacle liquid surface control level 720 as sensed by light phase receptacle liquid surface level sensor 720A, nor whenever the liquid free surface in light phase sump 150 is at, or above, light phase sump upper liquid surface control level 157 as sensed by light phase sump upper liquid surface level sensor 157A, nor whenever the liquid free surface in heavy phase sump 170 is at, above, heavy phase sump middle liquid surface control level 175 as sensed by heavy phase sump middle liquid surface level sensor 175A. When running, vacuum pump 400 causes the vacuum intensity in vacuum tank 100 to increase by evacuating the air above any liquid free surfaces in vacuum tank 100 from vacuum tank 100 through vacuum pump inlet air conduit 430, self-closing check valve 440, and vacuum pump exhaust air conduit 431 into air vent conduit 730 and out air vent conduit cap 760. Any vapors in the exhaust air of vacuum pump 400 that condense in vacuum pump exhaust air conduit 431 will flow to air vent conduit 730 and drain via air vent conduit 730 into light phase receptacle(s) 700. When vacuum pump 400 is not running, the vacuum intensity in vacuum tank 100 tends to pull air back through air vent conduit cap 760, vacuum pump exhaust air conduit 431, vacuum pump 400, and vacuum pump inlet air conduit 430. However, self-closing check valve 440 seals the vacuum intensity in vacuum tank 100 by preventing reverse air flow in vacuum pump inlet air conduit 430. In the preferred embodiment, self-closing check valve 440 is a spring loaded pneumatic check valve matched to accommodate the dynamic air flow characteristics of vacuum pump 400. Self-closing check valve 440 could also be a solenoid valve which opens when vacuum pump 400 runs and closes when vacuum pump 400 stops. If for some reason electric power fails to Mixed Immiscible Liquids Vacuum, Separation, and Disposal Method and System (Mod 1) 10, and if the vacuum intensity in vacuum tank 100 is lost completely before electric power is restored, positive air pressure inside vacuum tank 100 could build, which would violate codes and possibly cause a rupture or explosion of vacuum tank 100, which could cause personnel injury and/or property damage. Self-closing relief check valve 441, while sealing the vacuum in vacuum tank 100 during the normal operating conditions described above, provides automatic pressure relief directly to the atmosphere through bi-directional air conduit 432, which connects to vacuum pump exhaust air conduit 431 (that is, without passing through self-closing check valve 440 or vacuum pump 400) should a positive pressure develop in vacuum tank 100. In the preferred embodiment, self-closing relief check valve 441 is a self-closing pneumatic check valve with a very low cracking pressure, say less than 0.5 psig. Self-closing relief check valve 441 could also be a solenoid valve which opens automatically whenever power to Mixed Immiscible Liquids Vacuum, Separation, and Disposal Method and System (Mod 1) 10 fails, or whenever the vacuum intensity in vacuum tank 100 falls below 0 inches Mercury.

Vacuum regulating valve 443 is set to automatically admit atmospheric air whenever the vacuum intensity in vacuum tank 100 is slightly above the vacuum intensity control point or the upper limit of the vacuum intensity control range of vacuum sensor 420, by say about 2 inches Mercury. Vacuum regulating valve 443 serves three purposes: (1) to ensure that the vacuum intensity in vacuum tank 100 does not appreciably exceed the control setting of vacuum sensor 420, which would, under some mixed liquid collection circumstances where the vertical liquid lift height is relatively low, (say less than 8 feet) and the size of mixed immiscible liquids collection conduit(s) 230 is relatively large (say over 3 inches in diameter), transport the mixed immiscible liquids too fast, which could agitate and emulsify the mixed immiscible liquids unnecessarily; (2) helps ensure that the net positive suction head available at light phase extraction and discharge pump 500 and at heavy phase extraction and discharge pump 600 does not exceed the net positive suction head required by light phase extraction and discharge pump 500 and heavy phase extraction and discharge pump 600; and (3) provides a source of air to vacuum pump 400 to prevent overheating and damage of vacuum pump 400 if vacuum pump 400 runs while not under the control of vacuum sensor 420.

Solenoid relief valve 442 is closed whenever the liquid free surface in heavy phase sump 170 is below heavy phase sump upper liquid surface control level 176 as sensed by heavy phase sump upper liquid surface level sensor 176A. Solenoid relief valve 442 is open whenever the liquid free surface in heavy phase sump 170 is at, above, heavy phase sump upper liquid surface control level 176 as sensed by heavy phase sump upper liquid surface level sensor 176A. When open, solenoid relief valve 442 purges any vacuum in vacuum tank 100, thereby preventing the overfilling of heavy phase sump 170, which could occur if the flow rate through prefilter vessel exit conduit 231 appreciably exceeds the flow rate through heavy phase discharge conduit 41. If the liquid free surface in heavy phase sump 170 is above light phase sump weir static level 154, then heavy phase liquid will inadvertently spill over light phase sump left plate 151 into light phase sump 150, thereby re-mixing heavy phase liquid with light phase liquid, which subverts the main function of the invention.

Vacuum/pressure gauge 450 provides a visual measurement of the vacuum intensity in vacuum tank 100.

Mixed immiscible liquids, plus any grit, sediment, particulates, and floating debris, and plus any entrained air flow through mixed immiscible liquids collection conduit(s) 230 and collection network valve 243 into prefilter vessel 200 due to the vacuum in vacuum tank 100. When local collection valve 244 is open, a proximate source of mixed immiscible liquids, plus any grit, sediment, particulates, and floating debris, and plus any entrained air can also flow through local collection conduit 232 and local collection valve 244 into prefilter vessel 200 due to the vacuum in vacuum tank 100. Any grit, sediment, and/or particulates that enters prefilter vessel 200 whose specific gravity is greater than the specific gravity of the heavy phase in the mixed immiscible liquids will descend to the bottom of prefilter vessel 200, where prefilter element 202 will prevent their migration into prefilter vessel exit conduit 231. Prefilter element 202 will also prevent the migration of any floating debris into prefilter vessel exit conduit 231. Mixed immiscible liquids will pass through prefilter element 202 into prefilter vessel exit conduit 231 due to the vacuum in vacuum tank 100. As the openings in prefilter element 202 plug with grit, sediment, particulates, and/or floating debris, the liquid free surface in prefilter vessel 200 will gradually ascend. Once the liquid free surface ascends to, or past, prefilter vessel high liquid surface control level 210, prefilter vessel high liquid surface level sensor 210A will sense the liquid free surface, and will simultaneously initiate a visual and/or audible alarm in electrical/logic panel 50 that alerts the operator to replace prefilter element 202, and/or other Mixed Immiscible Liquids Vacuum, Separation, and Disposal Method and System (Mod 1) 10 functions as selected through electrical/logic panel 50. Vacuum/pressure gauge 250 provides a visual measurement of the vacuum intensity in prefilter vessel 200. Removable prefilter vessel cover 201 is provided for prefilter vessel 200 to permit access to prefilter element 202 for maintenance or replacement.

Upon exiting prefilter vessel 200, mixed immiscible liquids and any entrained air flow through prefilter vessel exit conduit 231 and prefilter vessel exit flow control valve 245 into energy dissipation and flow distribution chamber 110. In practical operation, prefilter vessel exit flow control valve 245 is sized, or is partially closed, to limit the actual maximum inflow rate into vacuum tank 100 to the design inflow rate in vacuum tank 100 under probable worst case conditions (i.e., a relatively high vacuum in vacuum tank 100 combined with a relatively low vertical liquid lift distance from the highest remote source of mixed immiscible liquids with respect to the top of prefilter vessel 200).

Mixed immiscible liquids and any entrained air in energy dissipation and flow distribution chamber 110 then descend through energy dissipation and flow distribution chamber perforated bottom plate 113 due to the vacuum in vacuum tank 100. The mixed immiscible liquids that exit energy dissipation and flow distribution chamber 110 descend to, and collect on the top of, separated light phase protection roof 114. Because separated light phase protection roof right end plate 115 presents a barrier to rightward flow into main gross phase separation chamber 140, mixed immiscible liquids flow leftward over the left edge of separated light phase protection roof 114 into separated light phase anti-disturbance chamber 130. Any entrained air separates from any mixed immiscible liquids and flows rightward above any mixed immiscible liquids that exist on top of separated light phase protection roof 114, then over separated light phase protection roof right end plate 115, and then to the penetration of vacuum pump inlet air conduit 430 into air void 120.

Mixed immiscible liquids flow into separated light phase anti-disturbance chamber 130 is relatively calm and nonturbulent to minimize agitation of any floating light phase that might exist in separated light phase anti-disturbance chamber 130. Any heavy phase in the mixed immiscible liquids that enters separated light phase anti-disturbance chamber 130 will descend through any floating light phase that might exist in separated light phase anti-disturbance chamber 130 into main gross phase separation chamber 140. Downward heavy phase flow friction in separated light phase anti-disturbance chamber 130 might also drag into main gross phase separation chamber 140 some of the floating light phase that might exist in separated light phase anti-disturbance chamber 130. Any light phase in the mixed immiscible liquids that enters separated light phase anti-disturbance chamber 130 will displace downward any floating light phase that might exist in separated light phase anti-disturbance chamber 130 into main gross phase separation chamber 140.

Any heavy phase that enters main gross phase separation chamber 140 will displace the existing heavy phase in main gross phase separation chamber 140 into heavy phase equalization chamber 160 to heavy phase sump weir dynamic level 173 and over heavy phase sump left plate 171 into heavy phase sump 170. Any heavy phase that enters main gross phase separation chamber 140 will also displace upward any floating accumulated light phase in main gross phase separation chamber 140. Depending on the flow rate of the heavy phase over the top of heavy phase sump left plate 171, the specific gravity of any floating accumulated light phase in main gross phase separation chamber 140, and the vertical distance between light phase sump weir static level 154 and the liquid free surface of any floating accumulated light phase in main gross phase separation chamber 140, floating accumulated light phase will ascend to light phase sump weir dynamic level 155 and will flow over the top of light phase sump left plate 151 into light phase sump 150.

Any discrete light phase that enters main gross phase separation chamber 140, or any mixed, dispersed, or emulsified light phase that separates from the heavy phase in main gross phase separation chamber 140, will ascend in main gross phase separation chamber 140 and will form, or join, a layer of floating accumulated light phase above light phase/heavy phase interface 144. Any light phase that enters into main gross phase separation chamber 140 will also displace existing heavy phase in main gross phase separation chamber 140 into heavy phase equalization chamber 160 to heavy phase sump weir dynamic level 173 and over heavy phase sump left plate 171 into heavy phase sump 170. Once the floating accumulated light phase in main gross phase separation chamber 140 attains a depth equal to the following calculated number:

$$D_{LP}=[(W_{LP,STATIC})-(W_{HP,DYNAMIC})]/[1-(SG_{LP}/SG_{HP})]$$

Where:
$D_{LP}$=Depth of floating light phase to light phase/heavy phase interface 144, measured in inches
$W_{LP,STATIC}$=Weir elevation, light phase, static, measured in inches, also light phase sump weir static level 154
$W_{HP,DYNAMIC}$=Weir elevation, heavy phase, dynamic, measured in inches, also heavy phase sump weir dynamic level 173
$SG_{LP}$=Specific Gravity, light phase
$SG_{HP}$=Specific Gravity, heavy phase continued additional light phase entering into, or separating in, main gross phase separation chamber 140, will cause the liquid free surface of floating accumulated light phase light phase to ascend above light phase sump weir static level 154 and to flow over light phase sump left plate 151 into light phase sump 150. Also while light phase enters into, or separates in, main gross phase separation chamber 140, heavy phase will continue to flow over heavy phase sump left plate 171 into heavy phase sump 170 until the depth of the floating light phase in main gross phase separation chamber 140 attains the following calculated number:

$$D_{LP}=[(W_{LP,DYNAMIC})-(W_{HP,STATIC})]/[1-(SG_{LP}/SG_{HP})]$$

Where:
$D_{LP}$=Depth of floating light phase to light phase/heavy phase interface 144, measured in inches
$W_{LP,DYNAMIC}$=Weir elevation, light phase, dynamic, measured in inches, also light phase sump weir dynamic level 155
$W_{HP,STATIC}$=Weir elevation, heavy phase, static, measured in inches, also heavy phase sump weir static level 172
$SG_{LP}$=Specific Gravity, light phase
$SG_{HP}$=Specific Gravity, heavy phase Once in main gross phase separation chamber 140, mixed immiscible liquid phase separation begins automatically by, as a minimum, differential specific gravity dissociation and vacuum induced low grade dissolved air floatation. Heavy phase flows from separated light phase anti-disturbance chamber 130 rightward and downward through main gross phase separation chamber 140 towards the entrance to heavy phase equalization chamber 160. Heavy phase flows through oleophilic media 143, if installed (recommended if the heavy phase is water or seawater and the light phase is oil).

Oleophilic media 143 is selected to attract any light phase liquids or droplets dispersed in the heavy phase while simultaneously repelling the heavy phase. Oleophilic media 143 is also selected to be continuously self-cleaning. During heavy phase descent through oleophilic media 143, any dispersed light phase droplets that have not already separated from the heavy phase and risen and joined any light phase floating on top of the heavy phase contact the surfaces of oleophilic media 143, which attracts these dispersed light phase droplets. On the surface of oleophilic media 143, these dispersed light phase droplets can coalesce into larger ones, which eventually grow large enough to separate from the surface of oleophilic media 143 and rise through the heavy phase at a velocity faster than the net effective downward velocity (plug flow) of the heavy phase. Any rising light phase droplets originating from relatively deep in the oleophilic media 143 bed typically impinge on other oleophilic media 143 surfaces, causing them to attach again, grow again, separate again, and rise again. This attachment, separation, detachment, and ascent cycle continues until rising droplets no longer encounter any oleophilic media 143 during their ascent. In the meantime, the heavy phase liquid contains lesser and lesser dispersed light phase droplets as it passes through oleophilic media 143.

Light phase sump upper liquid surface level sensor 157A and light phase sump lower liquid surface level sensor 156A control the operation of light phase extraction and discharge pump 500. Light phase extraction and discharge pump 500 will not run if the liquid free surface in light phase sump 150 is at, or below, light phase sump lower liquid surface control level 156 as sensed by light phase sump lower liquid surface level sensor 156A. If the liquid free surface in light phase sump 150 is above light phase sump lower liquid surface control level 156, then light phase extraction and discharge pump 500 will run if the control selector switch (not shown) for light phase extraction and discharge pump 500 on electrical/logic panel 50 is in the "manual" position. If the control selector switch (not shown) for light phase extraction and discharge pump 500 on electrical/logic panel 50 is in the "automatic" position, then light phase extraction and discharge pump 500 will start and run if the liquid free surface in light phase sump 150 is at light phase sump upper liquid surface control level 157 as sensed by light phase sump upper liquid surface level sensor 157A. Once started by light phase sump upper liquid surface level sensor 157A, light phase extraction and discharge pump 500 will continue to run (unless a power failure occurs, or unless an operator shifts the control selector switch to the "off" or "manual" position) until the liquid free surface in light phase sump 150 descends to light phase sump lower liquid surface control level 156 as sensed by light phase sump lower liquid surface level sensor 156A.

Heavy phase sump lower liquid surface level sensor 174A and heavy phase sump middle liquid surface level sensor 175A control the operation of heavy phase extraction and discharge pump 600. Heavy phase extraction and discharge pump 600 will not run if the liquid free surface in heavy phase sump 170 is at, or below, heavy phase sump lower liquid surface control level 174 as sensed by heavy phase sump lower liquid surface level sensor 174A. If the liquid free surface in heavy phase sump 170 is above heavy phase sump lower liquid surface control level 174, then heavy phase extraction and discharge pump 600 will run if the control selector switch (not shown) for heavy phase extraction and discharge pump 600 on electrical/logic panel 50 is in the "manual" position. If the control selector switch (not shown) for heavy phase extraction and discharge pump 600 on electrical/logic panel 50 is in the "automatic" position, then heavy phase extraction and discharge pump 600 will start and run if the liquid free surface in heavy phase sump 170 is at heavy phase sump middle liquid surface control level 175 as sensed by heavy phase sump middle liquid surface level sensor 175A. Once started by heavy phase sump middle liquid surface level sensor 175A, heavy phase extraction and discharge pump 600 will continue to run (unless a power failure occurs, or unless an operator shifts the control selector switch to the "off" or "manual" position) until the liquid free surface in heavy phase sump 170 descends to heavy phase sump lower liquid surface control level 174 as sensed by heavy phase sump lower liquid surface level sensor 174A.

Vacuum pump 400, light phase extraction and discharge pump 500, and heavy phase extraction and discharge pump 600 can all run simultaneously.

Once exiting oleophilic media 143, the heavy phase liquid, now free of much of the finely dispersed light phase droplets, enters heavy phase equalization chamber 160. The heavy phase flows rightward under light phase sump bottom plate 152, ascends between light phase sump right plate 153 and heavy phase sump left plate 171 to heavy phase sump weir dynamic level 173, and flows over the top of heavy phase sump left plate 171 into heavy phase sump 170.

Heavy phase extraction and discharge pump 600, when running, pulls heavy phase through heavy phase extraction and discharge pump suction conduit 630, heavy phase extraction and discharge pump suction shut-off valve 642, and check valve 641. Check valve 641 prevents heavy phase backflow and/or air leakage into heavy phase sump 170 through heavy phase extraction and discharge pump suction conduit 630 when heavy phase extraction and discharge pump 600 is off, which would otherwise occur due to the constant vacuum in vacuum tank 100. In the preferred embodiment, check valve 641 is a vertically oriented ball check valve. Check valve 641 could also be a normally closed solenoid or motorized valve which opens whenever heavy phase extraction and discharge pump 600 starts and runs, and closes whenever heavy phase extraction and discharge pump 600 stops. Check valve 641 could also be another type of check valve, such as a self-closing model, where its satisfactory operation is not dependent on its physical orientation.

Light phase extraction and discharge pump 500, when running, pulls light phase through light phase extraction and discharge pump suction conduit 530, light phase extraction and discharge pump suction shut-off valve 542, and check valve 541. Check valve 541 prevents light phase backflow and/or air leakage into light phase sump 150 through light phase extraction and discharge pump suction conduit 530 when light phase extraction and discharge pump 500 is off, which would otherwise occur due to the constant vacuum in vacuum tank 100. In the preferred embodiment, check valve 541 is a vertically oriented ball check valve. Check valve 541 could also be a normally closed solenoid or motorized valve which opens whenever light phase extraction and discharge pump 500 starts and runs, and closes whenever light phase extraction and discharge pump 500 stops. Check valve 541 could also be another type of check valve, such as a self-closing model, where its satisfactory operation is not dependent on its physical orientation. Siphon breaker 545 prevents the inadvertent siphonage of the contents of light phase sump 150 through light phase extraction and discharge pump suction conduit 530 through light phase extraction and discharge pump suction shut-off valve 542 through check valve 541 through light phase extraction and discharge pump 500 through partially treated light phase conduit 32 into light phase receptacle(s) 700 if, for example, light phase extraction and discharge pump 500 were running at the time of a total power failure to Mixed Immiscible Liquids Vacuum, Separation, and Disposal Method and System (Mod 1) 10 and vacuum tank 100 was not under vacuum and was open to the atmosphere.

Heavy phase extraction and discharge pump 600 discharges heavy phase liquids through partially treated heavy phase conduit 42 through heavy phase extraction and discharge pump discharge shut-off valve 643 into heavy phase intermediate separation stage 40. In the preferred embodiment, heavy phase extraction and discharge pump 600 is a positive displacement, low shear, pump. In this embodiment, pressure relief valve 640 limits the discharge pressure of heavy phase extraction and discharge pump 600, which protects heavy phase extraction and discharge pump 600, heavy phase intermediate separation stage 40, and all associated piping, tubing, and other connected devices. If the pressure at the discharge of heavy phase extraction and discharge pump 600 exceeds the control setting of pressure relief valve 640, the valve in pressure relief valve 640 opens, allowing liquid to return to the inlet of heavy phase extraction and discharge pump 600.

Light phase extraction and discharge pump 500 discharges light phase liquids through partially treated light phase conduit 32 into light phase receptacle(s) 700. In the preferred embodiment, light phase extraction and discharge pump 500 is a positive displacement, low shear, pump. In this embodiment, pressure relief valve 540 limits the discharge pressure of light phase extraction and discharge pump 500, which protects light phase extraction and discharge pump 500 and all associated piping, tubing, and other connected devices. If the pressure at the discharge of light phase extraction and discharge pump 500 exceeds the control setting of pressure relief valve 540, the valve in pressure relief valve 540 opens, allowing liquid to return to the inlet of light phase extraction and discharge pump 500. Vacuum/pressure gauge 550 provides a visual measurement of the discharge pressure of light phase extraction and discharge pump 500.

In heavy phase intermediate separation stage 40, heavy phase liquids enter through partially treated heavy phase conduit 42 into coalescer vessel 300, which holds coalescer element 302. Coalescer element 302 is selected to dynamically separate very finely dispersed, or emulsified, light phase droplets from the heavy phase carrier. In the preferred embodiment where the heavy phase liquid is water or seawater and the light phase liquid is lubricating, fuel, or vegetable oil, coalescer element 302 is a coalescer filter element made by any one of a number of manufacturers, such as FACET, SAREX, VELCON, SERFILCO, or BANNER ENGINEERING. Coalescer element 302 could also be one of many other devices which can separate the mixed immiscible liquids, such as an ultrafiltration membrane. In the preferred embodiment, liquid entering coalescer vessel 300 flows through coalescer element 302 from the interior of coalescer element 302 to the exterior of coalescer element 302. While passing through coalescer element 302, finely dispersed light phase droplets coalesce, grow, and form large droplets on the outside surface of coalescer element 302, which eventually separate from coalescer element 302 and ascend to the top of coalescer vessel 300, where heavy phase intermediate separation stage light phase return conduit 43 carries both phases through metering valve 343 and self-closing quick disconnect 344 into energy dissipation and flow distribution chamber 110, whereupon they reenter main gross phase separation chamber 140 as described above, separate again, and finally rejoin their respective phases in main gross phase separation chamber 140. Metering valve 343 adjusts to prevent turbulent flow in heavy phase intermediate separation stage light phase return conduit 43 without causing accumulation of separated light phase liquid at the top of coalescer vessel 300. Removable coalescer vessel cover 301 is provided for coalescer vessel 300 to permit access to coalescer element 302 for maintenance or replacement.

Heavy phase passing through coalescer element 302 flows out the bottom of coalescer vessel 300 into heavy phase discharge conduit 41, through shut-off valve 341, through check valve 342, and then through siphon breaker 345 to the heavy phase terminal facility. Check valve 342 prevents heavy phase backflow and air leakage into vacuum tank 100 through heavy phase discharge conduit 41, shut-off valve 341, coalescer vessel 300, and heavy phase intermediate separation stage light phase return conduit 43, which would otherwise occur due to the constant vacuum in vacuum tank 100. In the preferred embodiment, check valve 342 is a vertically oriented ball check valve. Check valve 342 could also be a normally closed solenoid or motorized valve which opens whenever heavy phase extraction and discharge pump 600 starts and runs, and closes whenever heavy phase extraction and discharge pump 600 stops. Check valve 342 could also be another type of check valve, such as a self-closing model, where its satisfactory operation is not dependent on its physical orientation. Siphon breaker 345 prevents the inadvertent siphonage of the contents of heavy phase sump 170 through heavy phase extraction and discharge pump suction conduit 630 through heavy phase extraction and discharge pump suction shut-off valve 642 through check valve 641 through heavy phase extraction and discharge pump 600 through partially treated heavy phase conduit 42 through heavy phase intermediate separation stage 40 through shut-off valve 341 through check valve 342 to the heavy phase terminal facility if, for example, heavy phase extraction and discharge pump 600 were running at the time of a total power failure to Mixed Immiscible Liquids Vacuum, Separation, and Disposal Method and System (Mod 1) 10 and vacuum tank 100 was not under vacuum and was open to the atmosphere.

Through taps into coalescer vessel 300 and into partially treated heavy phase conduit 42 upstream of heavy phase extraction and discharge pump discharge shut-off valve 643, differential pressure sensor 320 senses the differential pressure entering and exiting heavy phase intermediate separation stage 40. Differential pressure sensor 320 controls visual and/or audible alarms (not shown), and/or other Mixed Immiscible Liquids Vacuum, Separation, and Disposal Method and System (Mod 1) 10 functions as selected through electrical/logic panel 50. In the preferred embodiment, whenever the differential pressure matches or exceeds the control setting of differential pressure sensor 320, say by about 15 pounds per square inch gauge, electrical/logic panel 50 connects and maintains power to remote and/or local visual and audible alarms to alert personnel that coalescer element 302 is probably fouled or plugged, and therefore requires replacement to preserve design throughput flow. Vacuum/pressure gauge 350 and vacuum/pressure gauge 650 tapped into coalescer vessel 300 and partially treated heavy phase conduit 42, respectively, measure the respective inlet and outlet pressures of heavy phase intermediate separation stage 40. A single differential pressure gauge, or a compound readout pressure gauge could also be used to provide an alternate means to ascertain the differential pressure.

Drain valve 340 is opened to vacuum-drain the contents of coalescer vessel 300 into energy dissipation and flow distribution chamber 110 through drain conduit 330 whenever servicing of coalescer vessel 300 or coalescer element 302 is required. Flow rate limiting orifice 303 limits the flow exiting coalescer vessel 300 into energy dissipation and flow distribution chamber 110. In the preferred embodiment, drain valve 340 is a manually operated single union or true union ball valve. Other types of valves can also be used. One procedure to drain coalescer vessel 300 follows. Run heavy phase extraction and discharge pump 600 manually until heavy phase sump lower liquid surface level sensor 174A interrupts heavy phase extraction and discharge pump 600. Place heavy phase extraction and discharge pump 600 selector switch on electrical/logic panel 50 in "off" position. Open drain valve 340. Open metering valve 343. Disconnect self-closing quick disconnect 344. The vacuum in vacuum tank 100 will pull the liquid from coalescer vessel 300 through drain conduit 330 into energy dissipation and flow distribution chamber 110. As liquid exits coalescer vessel 300, atmospheric air will enter coalescer vessel 300 through metering valve 343 to replace the volume of liquid removed. Close drain valve 340 when coalescer vessel 300 is empty or sooner. Other coalescer vessel 300 drainage procedures using optional additional devices, such as purge valves installed in removable coalescer vessel cover 301, are possible.

Referring momentarily to FIG. 2, in the preferred embodiment, and where the heavy phase liquid is water or seawater and the light phase is lubricating oil, fuel oil, or vegetable oil, light phase intermediate separation stage 30 and light phase intermediate separation stage heavy phase return conduit 33 are not provided. Instead, the light phase flows directly through partially treated light phase conduit 32 and light phase discharge conduit 31 into its respective terminal facility.

Referring again to FIG. 3, in the preferred embodiment, and where the heavy phase liquid is water or seawater and the light phase is lubricating oil, fuel oil, or vegetable oil, the final destination (i.e., terminal facility) for light phase flow in partially treated light phase conduit 32 past siphon breaker 545 is light phase receptacle(s) 700. Light phase receptacle(s) 700 can be one or many containers, receptacles, tanks, or barrels. As light phase receptacle(s) 700 fill(s), the liquid level(s) rise(s), displacing air inside through air vent conduit(s) 730 and out air vent conduit cap(s) 760 into the atmosphere. Whenever the free surface liquid level in light phase receptacle(s) 700 is at, or above, light phase receptacle liquid surface control level(s) 720, light phase receptacle liquid surface level sensor(s) 720A will, through electrical/logic panel 50, energize remote and/or local audible and/or visual alarms, while simultaneously electrically disabling vacuum pump 400, light phase extraction and discharge pump 500, and heavy phase extraction and discharge pump 600, and all their respective control circuits, thereby preventing the overfilling of light phase receptacle(s) 700 by Mixed Immiscible Liquids Vacuum, Separation, and Disposal Method and System (Mod 1) 10. Local alarms located at light phase receptacle(s) 700 can serve to alert anyone in the vicinity that light phase receptacle(s) 700 are nearly full, which should dissuade anyone from manually introducing additional liquid into light phase receptacle(s) 700.

Drain valve 145 provides for the drainage of main gross phase separation chamber 140 and of heavy phase equalization chamber 160. Drain valve 159 provides for the drainage of light phase sump 150. Drain valve 178 provides for the drainage of heavy phase sump 170.

Referring to FIG. 3, FIG. 4, and FIG. 5, in the preferred embodiment, element replacement in prefilter vessel 200 can occur as follows: Have a bucket or other portable container available; place vacuum pump 400 selector switch on electrical/logic panel 50 in "off" position; open local collection valve 244 to purge vacuum in prefilter vessel 200 and in vacuum tank 100; when vacuum purged from vacuum tank 100, close prefilter vessel exit flow control valve 245, collection network valve 243, and local collection valve 244; temporarily disconnect mixed immiscible liquids collection conduit 230 from removable prefilter vessel cover 201; remove removable prefilter vessel cover 201; temporarily disconnect prefilter vessel exit flow control valve 245 from segment of prefilter vessel exit conduit 231 between prefilter vessel exit flow control valve 245 and prefilter vessel outlet vacuum tank penetration 116: unhook latches; tilt prefilter vessel 200 forward with the bucket placed under the top leading edge (to catch any floating debris and residual liquid in prefilter vessel 200) until the restraining chain or wire restraint prevents further tilting of prefilter vessel 200; remove prefilter element 202; remove grit, sediment, and particulates from prefilter vessel 200.

Referring to FIG. 3, FIG. 4, and FIG. 5, in the preferred embodiment, element replacement in coalescer vessel 300 can occur as follows: Drain coalescer vessel 300 as described above; close drain valve 340; temporarily disconnect partially treated heavy phase conduit 42 from removable coalescer vessel cover 301; temporarily disconnect siphon breaker 345 from the heavy phase terminal facility; temporarily disconnect drain valve 340 from segment of drain conduit 330 between drain valve 340 and coalescer vessel drain vacuum tank penetration 117; unhook latches; tilt coalescer vessel 300 forward until the restraining chain or wire prevents further tilting of coalescer vessel 300; remove removable coalescer vessel cover 301; unmount coalescer element 302 from removable coalescer vessel cover 301.

In the presently preferred embodiment, the following parts, materials, and components are used:
100 24" diameter, SDR 41, Type I PVC, 62" long, with welded, reinforced/braced 1" thick PVC ends, 72" overall length
143 JAEGAR PRODUCTS 1" diameter TRI-PAC
156A, THOMAS PRODUCTS custom float switch 4500-46572
157A
174A, THOMAS PRODUCTS custom float switch 4500-46573
175A,
176A
201 VELCON FILTERS, INC FO-614PLF5 filter cartridge
202 BANNER ENGINEERING CORPORATION OWS 14603 coalescer cartridge, 5 micron rating
210A THOMAS PRODUCTS 4500-41122 float switch
243, COLONIAL ENGINEERING V10141B single union PVC ball valve, 1"
245,
145,
159,
178,
542,
642
320 BARKSDALE EPD1H-BB40 differential pressure switch
340, COLONIAL ENGINEERING V08141B single union PVC ball valve, ¾"
341,
543,
643
342 COLONIAL ENGINEERING V08232B single union PVC ball check valve, ¾"
345, CASH ACME V101-3/4 siphon breaker valve
545
400 GAST MANUFACTURING CORPORATION 1023-101Q-G608X vacuum pump
420 BARKSDALE 96221-BB1-T5-W36 vacuum switch
440 SMC 490-6M6M-B air check valve
441 SMC 490-6M6M-B air check valve (w/ spring removed)
442 ASCO J8210G93 240V/60 Hz solenoid valve
443 CASH ACME FRM-V-3/8 vacuum relief valve
500, CONTINENTAL PUMP COMPANY CPM33-CSQMT-1/2-1-4 progressing cavity pump
600
541, COLONIAL ENGINEERING V10232B single union PVC ball check valve, 1"
641
540, CASH ACME MC75 pressure relief valve
640

CONCLUSION, RAMIFICATIONS, AND SCOPE OF INVENTION

Thus the reader will see that the invention significantly improves the previously patented Mixed Immiscible Liquids Collection, Separation, and Disposal Method and System (U.S. Pat. No. 5,679,258 issued to Petersen 1997 Oct. 21).

While the above description contains many specificities, they should not be construed as limitations on the scope of the invention, but rather as an exemplification of one preferred embodiment thereof. Besides those already mentioned, many other variations are possible. For example, referring to FIG. 2, heavy phase intermediate separation stage 40 and heavy phase intermediate separation stage light phase return conduit 43 could be eliminated if the heavy phase separation occurring in vacuum tank 100 satisfied the heavy phase terminal facility receiving requirements. Thus Mixed Immiscible Liquids Vacuum, Separation, and Disposal Method and System (Mod 1) 10 could discharge the separated heavy phase from vacuum tank 100 directly through partially treated heavy phase conduit 42 and heavy phase discharge conduit 41 to, say, heavy phase reuse elsewhere. Also, referring to FIG. 3, light phase sump lower liquid surface level sensor 156A, light phase sump upper liquid surface level sensor 157A, heavy phase sump lower liquid surface level sensor 174A, heavy phase sump middle liquid surface level sensor 175A, and heavy phase sump upper liquid surface level sensor 176A could satisfactorily perform their stated functions if each was mounted separately through the side of vacuum tank 100 instead of together on the same guide rod. Also, referring to FIG. 3, a normally closed float operated valve inside vacuum tank 100 that opens to the atmosphere when the liquid level in heavy phase sump 170 is at or above, heavy phase sump upper liquid surface control level 176 could substitute for the vacuum tank 100 vacuum purging function that solenoid relief valve 442 performs in concert with heavy phase sump upper liquid surface level sensor 176A. Also, referring to FIG. 3, coalescer element 302 could mount to the bottom of coalescer vessel 300 instead of removable coalescer vessel cover 301, with partially treated heavy phase conduit 42 penetrating the bottom of coalescer vessel 300 instead of removable coalescer vessel cover 301. Coalescer vessel 300 can also orient horizontally, provided that partially treated heavy phase conduit 42 continues to deliver liquid flow to the interior of coalescer element 302, and provided that heavy phase intermediate separation stage light phase return conduit 43 connects at the top of coalescer vessel 300, and provided that heavy phase discharge conduit 41 connects to the bottom of coalescer vessel 300 at the opposite end where partially treated heavy phase conduit 42 penetrates into coalescer vessel 300.

Accordingly, the scope of the invention should be determined not by the embodiment(s) illustrated but by the appended claims and their legal equivalents.

The invention claimed is:

1. A system to vacuum collect and vacuum convey mixed immiscible liquids from the source of, or the sources of, said mixed immiscible liquids into a separation facility, said mixed immiscible liquids being composed of a heavy phase and a light phase, the specific gravity of said heavy phase being greater than the specific gravity of said light phase, said separation facility being under continuous vacuum, to separate said mixed immiscible liquids into said heavy phase and said light phase in said separation facility, and once said heavy phase is separated from said light phase in said separation facility, to ultimately discharge said heavy phase to a heavy phase terminal facility, and to ultimately discharge said light phase to a light phase terminal facility, respectively, said heavy phase terminal facility and said light phase terminal facility both being under atmospheric pressure, comprising (a) a mixed immiscible liquids influent stream, said mixed immiscible liquids influent stream being said mixed immiscible liquids that flow into said separation facility, and (b) a vacuum tank, said vacuum tank having a predetermined volumetric holding capacity and a predetermined shape, and having a top and a bottom, said top of said vacuum tank being above said bottom of said vacuum tank, (c) said vacuum tank containing inside a main gross phase separation chamber, a light phase sump, a heavy phase equalization chamber, and a heavy phase sump, said main gross phase separation chamber and said light phase sump and said heavy phase equalization chamber and said heavy phase sump each delimiting a respective space inside said vacuum tank, each said respective space having a top and a bottom and sides, each said respective top of each said respective space being above each said respective bottom of each said respective space, and each said respective top of each said respective space being open and uncovered, (d) said vacuum tank also containing inside an air gap, said air gap being all space inside said vacuum tank below said top of said vacuum tank and above said top of said space of said main gross phase separation chamber and above said top of said space of said light phase sump and above said top of said space of said heavy phase equalization chamber and above said top of said space of said heavy phase sump, (e) said space of said light phase sump being isolated from said space of said main gross phase separation chamber and from said space of said heavy phase sump and from said space of said heavy phase equalization chamber, (f) said space of said heavy phase sump being isolated from said space of said main gross phase separation chamber and from said space of said light phase sump and from said space of said heavy phase equalization chamber, (g) said heavy phase equalization chamber being coupled to said bottom of said main gross phase separation chamber, (h) one or more of said sides, or a portion of said sides, of said light phase sump abutting said space of said main gross phase separation chamber, (i) one or more of said sides, or a portion of said sides, of said heavy phase sump abutting said space of said heavy phase equalization chamber, and (j) a vacuum tank air evacuation outlet, said vacuum tank air evacuation outlet penetrating into said top of said vacuum tank, and (k) a vacuum generating means, said vacuum generating means being coupled to said vacuum tank air evacuation outlet and causing and maintaining a continuous vacuum intensity in said vacuum tank, and (l) a vacuum tank mixed immiscible liquids inlet, said vacuum tank mixed immiscible liquids inlet penetrating into said top of said vacuum tank, and (m) a mixed immiscible liquids collection conduit, or a mixed immiscible liquids collection conduit network, said mixed immiscible liquids collection conduit or mixed immiscible liquids collection conduit network being coupled to said vacuum tank at said vacuum tank mixed immiscible liquids inlet and extending to said source, or said sources, of mixed immiscible liquids, (n) said mixed immiscible liquids influent stream discharging into said main gross phase separation chamber for simultaneous quiescent differential specific gravity separation process and vacuum induced dissolved air flotation process, said mixed immiscible liquids influent stream dissociating into a separated light phase and a separated heavy phase in said main gross phase separation chamber, said separated light phase floating above said separated heavy phase, (o) said light phase sump having a horizontal top edge weir along said top of said sides of said light phase sump along all said sides of said light phase sump that abut said space of said main gross phase separation chamber, said horizontal top edge weir of said light phase sump being below said top of said vacuum tank, and establishing said top of said space of said main gross phase separation chamber and said top of said space of said light phase sump, (p) said heavy phase sump having a horizontal top edge weir along said top of said sides of said heavy phase sump along all said sides of said heavy phase sump that abut said space of said heavy phase equalization chamber, said horizontal top edge weir of said heavy phase sump being slightly below said horizontal top edge weir of said light phase sump, and establishing said top of said space of said heavy phase equalization chamber and said top of said space of said heavy phase sump, (q) said sides of said heavy phase equalization chamber and said sides of said heavy phase sump that abut said main gross phase separation chamber and/or said light phase sump having a respective top edge, said respective top edge of said sides of said heavy phase equalization chamber and/or said heavy phase sump being slightly above said top of said space of said main gross phase separation chamber and said top of said space of said light phase sump, and (r) a light phase sump liquid surface level is a horizontal plane and is existing inside said light phase sump if the liquid surface level of said separated light phase in said main gross phase separation chamber is, or has been, above said top of said space of said main gross phase separation chamber, and (s) a heavy phase sump liquid surface level is a horizontal plane and is existing inside said heavy phase sump if the liquid surface level of said separated heavy phase in said heavy phase equalization chamber is, or has been, above said top of said space of said heavy phase equalization chamber, and (t) a light phase sump upper liquid surface level sensing means, said light phase sump upper liquid surface level sensing means being located inside said light phase sump below said top of said space of said light phase sump, and (u) a light phase sump lower liquid surface level sensing means, said light phase sump lower liquid surface level sensing means being located inside said light phase sump below said light phase sump upper liquid surface level sensing means, and (v) a heavy phase sump upper liquid surface level sensing means, said heavy phase sump upper liquid surface level sensing means being located inside said heavy phase sump below said top of said space of said heavy phase sump, and (w) a heavy phase sump lower liquid surface level sensing means, said heavy phase sump lower liquid surface level sensing means being located inside said heavy phase sump below said heavy phase sump upper liquid surface level sensing means, and (x) a light phase sump outlet, said light phase sump outlet being located below said light phase sump lower liquid surface level sensing means, and (y) a heavy phase sump outlet, said heavy phase sump outlet being located below said heavy phase sump lower liquid surface level sensing means, and (z) a light phase flow control means, said light phase flow control means being coupled to said light phase sump outlet and extracting said separated light phase from said light phase sump and delivering said light phase to said light phase terminal facility, and (aa) a heavy phase flow control means, said heavy phase flow control means being coupled to said heavy phase sump outlet and extracting said separated heavy phase from said heavy phase sump and delivering said heavy phase to said heavy phase terminal facility, (bb) said light phase sump upper liquid surface level sensing means initiating the operation of said light phase flow control means at any time said light phase sump liquid surface level is at, or above, the elevation of said light phase sump upper liquid surface level sensing means, (cc) said light phase sump lower liquid surface level sensing means preventing the operation of said light phase flow control means at any time said light phase sump liquid surface level is at, or below, the elevation of said light phase sump lower liquid surface level sensing means, (dd) said heavy phase sump upper liquid surface level sensing means initiating the operation of said heavy phase flow control means if said heavy phase sump liquid surface level is at, or above, the elevation of said heavy phase sump upper liquid surface level sensing means, (ee) said heavy phase sump lower liquid surface level sensing means preventing the operation of said heavy phase flow control means if said heavy phase sump liquid surface level is at, or below, the elevation of said heavy phase sump lower liquid surface level sensing means, and (ff) a vacuum generating means/vacuum tank coupling conduit, said vacuum generating means/vacuum tank coupling conduit coupling said vacuum generating means to said vacuum tank at said vacuum tank air evacuation outlet, and (gg) a light phase flow control means/light phase sump coupling conduit, said light phase flow control means/light phase sump coupling conduit coupling said light phase flow control means to said light phase sump outlet, and (hh) a heavy phase flow control means/heavy phase sump coupling conduit, said heavy phase flow control means/heavy phase sump coupling conduit coupling said heavy phase flow control means to said heavy phase sump outlet.

2. The system of claim 1, further including a grit, sediment, particulate, and floating debris removal means, said grit, sediment, particulate and floating debris removal means being selected from the group consisting of filters, strainers, screens, and settling chambers, said grit, sediment, particulate and floating debris removal means being established in said mixed immiscible liquids influent stream prior to said vacuum tank mixed immiscible liquids inlet.

3. The system of claim 1, further including a mixed immiscible liquids influent stream energy dissipation and flow distribution chamber, said mixed immiscible liquids influent stream energy dissipation and flow distribution chamber having a predetermined volume and a predetermined shape, and being coupled to said vacuum tank mixed immiscible liquids inlet, and having a top and a bottom plate, said bottom plate of said mixed immiscible liquids influent stream energy dissipation and flow distribution chamber being below said top of said mixed immiscible liquids influent stream energy dissipation and flow distribution chamber and being above said top of said space of said main gross phase separation chamber, and being comprised of an opening, or openings, of predetermined size or sizes, shape or shapes, and configuration or configurations.

4. The system of claim 1, further including a combined entrained air purging and back siphonage prevention means, said combined entrained air purging and back siphonage prevention means being said air gap inside said vacuum tank.

5. The system of claim 1, further including a separated light phase protection roof, said separated light phase protection roof comprising:

(a) a roof panel, said roof panel being horizontal, and having sides, and having a near end edge, and having a distant end edge, and being above said top of said space of said main gross phase separation chamber, and being below said top of said vacuum tank, (b) said roof panel being connected to said vacuum tank along said sides of said roof panel, said sides of said roof panel further being sealed continuously to said vacuum tank to be liquid tight, (c) said near end edge of said roof panel being closer to said light phase sump than said distant end edge of said roof panel, and (d) a roof panel near end edge elevated flow barrier wall, said roof panel near end edge elevated flow barrier wall being more or less vertical, and having sides, and having a top edge and a bottom edge,
- (e) said bottom edge of said roof panel near end edge elevated flow barrier wall being below said top edge of said roof panel near end edge elevated flow barrier wall, and being connected to said near end edge of said roof panel along said bottom edge of said roof panel near end edge elevated flow barrier wall, and further being sealed continuously to said near end edge of said roof panel along said bottom edge of said roof panel near end edge elevated flow barrier wall to be liquid tight,
- (f) said top edge of said roof panel near end edge elevated flow barrier wall being below said top of said vacuum tank,
- (g) said sides of said roof panel near end edge elevated flow barrier wall being connected to said vacuum tank, and further being sealed continuously to said vacuum tank along said sides of said roof panel near end edge elevated flow barrier wall to be liquid tight.

6. The system of claim 5, further including a separated light phase anti-disturbance partition wall, said separated light phase anti-disturbance partition wall being oriented upright, and having sides, and having a top edge and a bottom edge,
- (a) said top edge of said separated light phase anti-disturbance partition wall being above said bottom edge of said separated light phase anti-disturbance partition wall, and being connected to said distant end edge of said roof panel along said top edge of said separated light phase anti-disturbance partition wall, and further being sealed continuously to said distant end edge of said roof panel along said top edge of said separated light phase anti-disturbance partition wall to be liquid tight,
- (b) said bottom edge of said separated light phase anti-disturbance partition wall being below the interface of said separated light phase and said separated heavy phase in said main gross phase separation chamber,
- (c) said sides of said separated light phase anti-disturbance partition wall being connected to said vacuum tank, and further being sealed continuously to said vacuum tank along said sides of said separated light phase anti-disturbance partition wall to be liquid tight.

7. The system of claim 1, wherein said light phase sump upper liquid surface level sensing means and/or said heavy phase sump upper liquid surface level sensing means also prevents the operation of said vacuum generating means if
- (a) said light phase sump liquid surface level is at, or above, said light phase sump upper liquid surface level sensing means, or
- (b) said heavy phase sump liquid surface level is at, or above, said heavy phase sump upper liquid surface level sensing means.

8. The system of claim 1, further including a quantity of high void space light phase separation enhancement media means, said quantity of high void space light phase separation enhancement media means being fixed inside said vacuum tank in said main gross phase separation chamber and being below the interface between said separated light phase and said separated heavy phase, said quantity of high void space light phase separation enhancement media means having void space and structure to permit laminar multi-directional flow of said mixed immiscible liquids through said quantity of high void space light phase separation enhancement media means at any time that said mixed immiscible liquids flow into said main gross phase separation chamber, and having surface and presenting more than 40 square feet of the area of said surface of said quantity of high void space light phase separation enhancement media means per in-situ cubic foot of said quantity of high void space light phase separation enhancement media means, and being of a material that preferentially attracts said light phase to said quantity of high void space light phase separation enhancement media means, said quantity of high void space light phase separation enhancement media means attracting and temporarily holding said light phase at said surface of said quantity of high void space light phase separation enhancement media means until said light phase that attaches to said surface of said quantity of high void space light phase separation enhancement media means accumulates and grows to a size that said light phase detaches from said surface of said quantity of high void space light phase separation enhancement media means and ascends through said heavy phase by virtue of differences in specific gravity between said light phase and said heavy phase.

9. The system of claim 1, further including a full light phase terminal facility triggered system operation interrupt and alarm means, said full light phase terminal facility triggered system operation interrupt and alarm means comprising a light phase terminal facility high free surface liquid level sensing means, said light phase terminal facility high free surface liquid level sensing means being installed inside said light phase terminal facility if said light phase terminal facility is a light phase storage container means, said light phase storage container means being selected from the group consisting of tanks, drums, barrels, vaults, containers, and combinations thereof, and having a light phase storage container means liquid level if said light phase storage container means contains said light phase, said light phase terminal facility high free surface liquid level sensing means simultaneously preventing the operation of said light phase flow control means if said light phase storage container means liquid level is at, or above, said light phase terminal facility high free surface liquid level sensing means, and energizing an alarm system means, said alarm system means being selected from the group consisting of local visual alarms, local audible alarms, combination local and visual and audible alarms, remote visual alarms, remote audible alarms, combination remote visual and audible alarms, and combinations thereof.

10. The system of claim 1, further including a full heavy phase terminal facility triggered system operation interrupt and alarm means, said full heavy phase terminal facility triggered system operation interrupt and alarm means comprising a heavy phase terminal facility high free surface liquid level sensing means, said heavy phase terminal facility high free surface liquid level sensing means being installed inside said heavy phase terminal facility at any time said heavy phase terminal facility is a heavy phase storage container means, said heavy phase storage container means being selected from the group consisting of tanks, drums, barrels, vaults, containers, and combinations thereof, and having a heavy phase storage container means liquid level at any time that said heavy phase storage container means contains said heavy phase, said heavy phase terminal facility high free surface liquid level sensing means simultaneously preventing the operation of said heavy phase flow control means at any time that said heavy phase storage container means liquid level is at, or above, said heavy phase terminal facility high free surface liquid level sensing means, and energizing an alarm system means, said alarm system means being selected from the group consisting of local visual alarms, local audible alarms, combination local and visual and audible alarms, remote visual alarms, remote audible alarms, combination remote visual and audible alarms, and combinations thereof.

11. The system of claim 1, further including flow reversal prevention means, said flow reversal prevention means being selected from the group consisting of check valves, solenoid valves, and pneumatically operated shut-off valves, and combinations thereof, said flow reversal prevention means being installed in said vacuum generating means/ vacuum tank coupling conduit, in said light phase flow control means/light phase sump coupling conduit, and in said heavy phase flow control means/heavy phase sump coupling conduit.

12. The system of claim 1, further including an heavy phase supplemental separation means, said heavy phase supplemental separation means selected from the group consisting of coalescing filter separation means, ultrafiltration separation means, reverse osmosis separation means, centrifuge separation means, distillation separation means, microfiltration entrapment means, selective phase absorption means, selective phase adsorption means, and combinations thereof, said heavy phase supplemental separation means being established between said heavy phase flow control means and said heavy phase terminal facility, whereby said heavy phase supplemental separation means increases the degree of separation of said light phase from said heavy phase after said heavy phase exits said vacuum tank, said heavy phase supplemental separation means comprising
  (a) a heavy phase supplemental separation means pretreated heavy phase inlet, said heavy phase supplemental separation means pretreated heavy phase inlet penetrating said heavy phase supplemental separation means, and
  (b) a heavy phase supplemental separation means separated heavy phase outlet, said heavy phase supplemental separation means separated heavy phase outlet penetrating said heavy phase supplemental separation means, and
  (c) provided that said heavy phase supplemental separation means is not said microfiltration entrapment means, or said selective phase absorption means, or said selective phase adsorption means, a heavy phase supplemental separation means separated light phase outlet, said heavy phase supplemental separation means separated light phase outlet penetrating said heavy phase supplemental separation means, and
  (d) a heavy phase supplemental separation means pretreated heavy phase inlet coupling conduit, said heavy phase supplemental separation means pretreated heavy phase inlet coupling conduit coupling said heavy phase supplemental separation means to said heavy phase flow control means, and
  (e) a heavy phase supplemental separation means separated heavy phase outlet coupling conduit, said heavy phase supplemental separation means separated heavy phase outlet coupling conduit coupling said heavy phase supplemental separation means to said heavy phase terminal facility, and
  (f) provided that said heavy phase supplemental separation means is not said microfiltration entrapment means, or said selective phase absorption means, or said selective phase adsorption means, a heavy phase supplemental separation means separated light phase outlet coupling conduit, said heavy phase supplemental separation means separated light phase outlet coupling conduit coupling said heavy phase supplemental separation means to said vacuum tank, and
  (g) provided that said heavy phase supplemental separation means separated light phase outlet coupling conduit coupling exists, a heavy phase supplemental separation means separated heavy phase outlet coupling conduit flow reversal prevention means, said heavy phase supplemental separation means separated heavy phase outlet coupling conduit flow reversal prevention means being selected from the group consisting of check valves, solenoid valves, pneumatically operated shut-off valves, and combinations thereof, and being established in said heavy phase supplemental separation means separated heavy phase outlet coupling conduit.

13. The system of claim 1, further including an light phase supplemental separation means, said light phase supplemental separation means selected from the group consisting of coalescing filter separation means, ultrafiltration separation means, reverse osmosis separation means, centrifuge separation means, distillation separation means, microfiltration entrapment means, selective phase absorption means, selective phase adsorption means, and combinations thereof, said light phase supplemental separation means being established between said light phase flow control means and said light phase terminal facility, whereby said light phase supplemental separation means increases the degree of separation of said heavy phase from said light phase after said light phase exits said vacuum tank, said light phase supplemental separation means comprising
  (a) a light phase supplemental separation means pretreated light phase inlet, said light phase supplemental separation means pretreated light phase inlet penetrating said light phase supplemental separation means, and
  (b) a light phase supplemental separation means separated light phase outlet, said light phase supplemental separation means separated light phase outlet penetrating said light phase supplemental separation means, and
  (c) provided that said light phase supplemental separation means is not said microfiltration entrapment means, or said selective phase absorption means, or said selective phase adsorption means, a light phase supplemental separation means separated heavy phase outlet, said light phase supplemental separation means separated heavy phase outlet penetrating said light phase supplemental separation means, and
  (d) a light phase supplemental separation means pretreated light phase inlet coupling conduit, said light phase supplemental separation means pretreated light phase inlet coupling conduit coupling said light phase supplemental separation means to said light phase flow control means, and
  (e) a light phase supplemental separation means separated light phase outlet coupling conduit, said light phase supplemental separation means separated light phase outlet coupling conduit coupling said light phase supplemental separation means to said light phase terminal facility, and
  (f) provided that said light phase supplemental separation means is not said microfiltration entrapment means, or said selective phase absorption means, or said selective phase adsorption means, a light phase supplemental separation means separated heavy phase outlet coupling conduit, said light phase supplemental separation means separated heavy phase outlet coupling conduit coupling said light phase supplemental separation means to said vacuum tank, and (g) provided that said light phase supplemental separation means separated heavy phase outlet coupling conduit coupling exists, a light phase supplemental separation means separated light phase outlet coupling conduit flow reversal prevention means, said light phase supplemental separation means separated light phase outlet coupling conduit flow reversal prevention means being selected from the group consisting of check valves, solenoid valves, pneumatically operated shut-off valves, and combinations thereof, and being established in said light phase supplemental separation means separated light phase outlet coupling conduit.

14. The system of claim 1, further including a mixed immiscible liquids collection conduit flow control valve means, said mixed immiscible liquids collection conduit flow control valve means being selected from the group consisting of manually operated valves, mechanically operated valves, electro-mechanically operated valves, and pneumatically operated valves, and combination thereof, said mixed immiscible liquids collection conduit flow control valve means being installed in said mixed immiscible liquids collection conduit, or, if said mixed immiscible liquids collection conduit network exists, in each branch conduit of said mixed immiscible liquids collection conduit network.

15. The system of claim 1, further including a vacuum sensing means, said vacuum sensing means being coupled to said vacuum tank and to said vacuum generating means, and being used to maintain a constant vacuum intensity inside said vacuum tank as created by said vacuum generating means.

16. The system of claim 1, further including a vacuum tank positive pressure prevention means, said vacuum tank positive pressure prevention means being selected from the group consisting of pressure relief valves and check valves, and combinations thereof, and being coupled to said vacuum tank and, if said light phase terminal facility and/or if said heavy phase terminal facility exists, and if said light phase terminal facility and/or said heavy phase terminal facility is a storage container means, said storage container means being selected from the group consisting of tanks, drums, barrels, vaults, containers, and combinations thereof, and if a vent conduit in said storage container means exists, being coupled to said vent conduit in said storage container means.

17. The system of claim 1, wherein the exhaust air exiting from said vacuum generating means is coupled to said light phase terminal facility or to said heavy phase terminal facility, if said light phase terminal facility and/or if said heavy phase terminal facility exists, and if said light phase terminal facility and/or said light phase terminal facility is a storage container means, said storage container means being selected from the group consisting of tanks, drums, barrels, vaults, containers, and combinations thereof, and if a vent conduit in said storage container means exists, by said vent conduit in said storage container means.

18. The system of claim 1, further including a vacuum tank maximum vacuum intensity regulating means, said vacuum tank maximum vacuum intensity regulating means being selected from the group consisting of vacuum relief valves and combinations thereof, and being coupled to said top of said vacuum tank.

19. The system of claim 1, further including a heavy phase sump high liquid level activated vacuum tank vacuum purging means, said heavy phase sump high liquid level activated vacuum tank vacuum purging means being selected from the group consisting of solenoid valves, float actuated valves, and combinations thereof, said heavy phase sump high liquid level activated vacuum tank vacuum purging means having an inlet opening and outlet opening, said inlet opening of said heavy phase sump high liquid level activated vacuum tank vacuum purging means being coupled to the atmosphere, said outlet opening of said heavy phase sump high liquid level activated vacuum tank vacuum purging means being coupled to said air gap inside said vacuum tank, said heavy phase sump high liquid level activated vacuum tank vacuum purging means isolating said air gap inside said vacuum tank from the atmosphere external to said vacuum tank at any time that said heavy phase sump liquid surface level is below a heavy phase sump high liquid surface level sensing means, said heavy phase sump high liquid surface level sensing means being located inside said heavy phase sump above said heavy phase sump upper liquid surface level sensing means and below said top of said space of said heavy phase sump, said heavy phase sump high liquid surface level sensing means causing said heavy phase sump high liquid level activated vacuum tank vacuum purging means to open at any time that said heavy phase sump liquid surface level is at, or above, said heavy phase sump high liquid surface level sensing means.

* * * * *